(12) United States Patent
Fargo

(10) Patent No.: US 10,737,185 B2
(45) Date of Patent: Aug. 11, 2020

(54) VIRTUAL ENVIRONMENT CONTROLS BASED ON VOICE CHAT AUDIO INPUTS

(71) Applicant: Microsoft Technology Licensing, LLC, Redmond, WA (US)

(72) Inventor: Brian Fargo, Newport Beach, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/522,637

(22) Filed: Jul. 25, 2019

(65) Prior Publication Data

US 2019/0344185 A1    Nov. 14, 2019

Related U.S. Application Data

(63) Continuation-in-part of application No. 13/256,898, filed as application No. PCT/US2010/027860 on Mar. 18, 2010, now abandoned.

(60) Provisional application No. 61/161,366, filed on Mar. 18, 2009.

(51) Int. Cl.
| | |
|---|---|
| *A63F 13/77* | (2014.01) |
| *A63F 13/52* | (2014.01) |
| *G06T 19/00* | (2011.01) |
| *G06F 3/16* | (2006.01) |
| *H04N 7/15* | (2006.01) |
| *A63F 13/215* | (2014.01) |
| *A63F 13/35* | (2014.01) |
| *A63F 13/54* | (2014.01) |
| *A63F 13/87* | (2014.01) |

(52) U.S. Cl.
CPC .............. *A63F 13/87* (2014.09); *A63F 13/52* (2014.09); *G06F 3/165* (2013.01); *G06T 19/003* (2013.01); *H04N 7/157* (2013.01)

(58) Field of Classification Search
CPC .......... A63F 13/87; A63F 13/52; G06F 3/165; G06T 19/003; H04N 7/157
See application file for complete search history.

(56) References Cited

U.S. PATENT DOCUMENTS

| | | | |
|---|---|---|---|
| 2012/0014553 A1* | 1/2012 | Bonanno | H03G 3/341 381/364 |
| 2016/0103653 A1* | 4/2016 | Jang | G06F 3/165 381/107 |
| 2019/0221035 A1* | 7/2019 | Clark | A63F 13/211 |

(Continued)

*Primary Examiner* — Werner G Garner
(74) *Attorney, Agent, or Firm* — Newport IP, LLC; Scott Y. Shigeta

(57) ABSTRACT

In a virtual environment such as an online game, a voice chat audio signal controls the volume of chat audio signals between users. The volume of chat audio signals between users can be controlled depending on one or more factors such as volume of the user's voices spoken into their audio input device and the relative positions of virtual objects controlled by the users. In one implementation, a voice chat audio signal from a first user to a second user is reduced in volume if a distance between the virtual objects of the first and second players exceeds a threshold distance and if the volume in audio input device of the first player is less than a threshold volume. A volume of a user's chat input can also control aspects of a virtual environment. The result a more realistic audible chat interaction among users controlling characters in a virtual environment.

20 Claims, 14 Drawing Sheets

(56) References Cited

U.S. PATENT DOCUMENTS

2019/0250879 A1* 8/2019 Blume ................. G10L 15/265
2019/0286412 A1* 9/2019 McGibney ............. G06F 3/165

* cited by examiner

VIRTUAL ENVIRONMENT CONTROLS BASED ON VOICE CHAT AUDIO INPUTS

RELATED PRIORITY APPLICATIONS

The present application is a continuation-in-part of co-pending U.S. patent application Ser. No. 13/256,898, filed Oct. 4, 2011, which claims priority to the earlier filed PCT Application No. PCT/US2010/027860 filed on Mar. 18, 2010, which claims priority to U.S. Provisional Application Ser. No. 61/161,366 filed on Mar. 18, 2009, the contents of the listed applications are hereby incorporated by reference in their entirety.

BACKGROUND

There are many multi-player online games and virtual reality systems in today's society that allow large numbers of individual players to participate and play the same game, both as allies and as enemies. There are many popular games that have thousands of users all playing the same game together, sometimes in virtual worlds and utilizing virtual characters. These games can be very realistic from a game playing viewpoint, yet many have drawbacks that may take away from the realism of the game.

One of the many advantages to these games and a factor that draws many individuals to play these games is that several individual users and/or players can participate in the game at the same time. Moreover, another factor that draws many individuals to play online games is the ability to utilize a character object which can be an online representation of any character that they wish to display to other online gamers including, for example, an avatar which is a virtual representation of the player. An individual player may be represented by many different types of avatars and characters. The characteristics of an avatar may be chosen by the individual player and may be changed at will. Additionally, because some of these characters become synonymous with the individual player, many other individual players know only the created character of a particular individual.

Another enticing factor to many online gamers is the ability to socialize, network and play with other individuals that are also playing in the same virtual world. Typical users will have a microphone or headset which allows them to speak to other individuals that are also engaged in online game play. It is very typical for multiple players to know each other and for them to engage with other players. Online game participants can cooperate and/or compete with each other to achieve specific goals within the game. In many cases, cooperation between several players is essential in order for certain objectives to be achieved and competition between teams of players is not uncommon.

Existing online gaming voice control has a number of drawbacks. First, because the individual user is using a headset or other voice system, the information is digitally fed into the game whereby the voice patterns, pitch and volumes are simply projected to other players with no real effect in game play. Platforms that enable voice communication between the individual participants and players typically provide a chat channel that is independent of the audio channel providing sounds of a game. Thus, gaming platforms are typically unable to utilize the user voice communication as a form of user input. Additionally, because voice characteristics do not affect game play, no thought or strategy is given as to how communication is made during online game play. For example, when a player desires to communicate with another player, they simply speak into their headset to alert or communicate. If the player yells or whispers, there is no effect on game play. This results in a lack of realism among participants in a virtual environment controlling virtual character objects within some proximity of each other.

Therefore, a need still exists for analyzing and incorporating voice characteristic reaction and alteration during online game play. Additionally, a need exists for analyzing, filtering and processing voice criterion and allowing the game and/or software to react to voice fluctuations depending on speech analysis, volume, pitch and other speech characteristics and altering game play based on the speech analysis of each individual player.

SUMMARY OF THE INVENTION

The techniques described herein enable a system to utilize voice chat communication between multiple participants to control aspects of a virtual environment. For instance, a system can control the actions and/or the appearance of a character object, such as an avatar. When a user controlling an avatar raises their voice in a chat channel, the system can detect the change in the volume and modify the appearance of the user's avatar, e.g., if the user starts yelling, the system can control the avatar to make it appear to be yelling. In some configurations, a system can also control the vocal communication between participants. For instance, if a first user ("first participant") controlling a character object starts to whisper in a chat channel, the system can communicate the user's voice input to other user's associated with character objects within a threshold distance of the first user's character object. The system can also block the communication of the user's voice input to other user's associated with character objects that are not within the threshold distance of the first user's character object. The disclosed techniques achieve this effect by regulating the volume of chat audio streams, also referred to herein as a "chat audio signal 115" or "chat audio 115," communicated between participants depending on various factors such as the distance between virtual objects, and in some cases, with respect to the input volume of the participants, i.e. how loudly a participant speaks into their microphone.

In some embodiments, a host device operates an application for managing session data that defining a three-dimensional or two-dimensional virtual environment. The session data defines coordinates by which virtual objects are positioned. The application causes the generation of session audio data in response to activity of the virtual objects, as well as manages voice chat audio streams that enable vocal communication between a plurality of participants controlling the virtual objects. A distance is determined between virtual objects controlled by participants. For example, a distance is determined between virtual objects controlled by a first participant and a second participant. The distance is then compared to at least one threshold distance. If the distance does not exceed the threshold distance, the chat audio between the first and second participants is maintained at a predetermined volume level. In some embodiments, the volume of chat audio between the first and second participants is reduced in response to determining the distance exceeds the threshold distance. Additionally, in some embodiments, the volume of an chat audio signal generated by an input devices of the participants is monitored, and the chat volume between the first and second participants is reduced in response to determining that the volume of the chat audio signal generated by the input device of the first participant is less than a threshold volume.

Reducing volume can be achieved through various techniques. In some embodiments, chat audio is delivered at a full volume level during optimal communication conditions, such as between participants controlling virtual objects or characters separated by a distance less than the threshold distance. A zone within this threshold might be considered a "whisper zone" as characters in close proximity can optimally communicate due to the full volume of the audio streams. Reductions in volume are made relative to the full volume. Such reductions may be in predetermined increments or according to an algorithm. For example, when the distance between virtual objects exceeds the threshold distance, the chat audio streams between the participants controlling those objects may be reduced by a proportion of the full volume, such as 25%, 50%, 80%, etc. In some implementations, conditions can be programed to result in a 100% reduction in chat audio between participants, i.e., no volume, such as when virtual objects controlled by those participants are separated by a long distance.

The threshold volume may be determined in a variety of possible ways. In one embodiment, the threshold volume can be set at a predetermined volume. However, participants may have different vocal characteristics, such a normal speaking volume for one person may be higher than for another. Also, variations in equipment and background noise may vary among participants, thus leading to different characteristics of captured input audio signals through their respective input devices. In order to help normalize volume control behavior, a process may be implemented to establish a baseline input volume for a given participant. This baseline input can be used to establish a threshold volume for the input audio chat signal captured by the microphone of the participant.

For example, a sample of the chat audio analyzes a sample of the chat audio signal from the input device for the first user over a time period. A baseline volume level can be derived from the resulting data, such as an average volume level over the time period of the sample, or some other analytical technique. The threshold volume can then be set as a function of the baseline volume. The threshold volume can be set to equal the baseline volume in one implementation, or in another implementation the threshold volume can be set greater than the baseline. For example, the threshold volume can be set a selected proportion higher than the baseline volume (e.g., 20% higher, 100% higher, etc) or alternatively by a selected loudness increment higher than the baseline volume (e.g., 5 dB higher, 10 dB higher, etc). The threshold volume can be set at a selected level to achieve desired results. The baseline volume can serve as a reference for a predetermined volume level, e.g., a full volume level or at a preset level, of audio input from that participant. Also, the volume threshold can be set at a predetermined value higher than the baseline volume. In one implementation the baseline is determined before the first virtual object begins interaction with the virtual environment. In some configurations the system can establish a baseline volume based on a sample of the chat audio signal from the input device associated with the first user ($P_1$), wherein the baseline volume is established by receiving a voice input prior to the generation of session audio data. This way, the session audio does not interfere with the establishment of the baseline volume.

In some embodiments, a volume level of the chat audio signal between the first participant and the second participant is controlled to variably reduce the chat volume relative to a predetermined volume level, e.g., a full volume level, as a function of the distance between the virtual objects controlled by the respective participants. Thus, simulating, participants can communicate easier and using quieter voices when their virtual objects are at close proximity, but as the distance between objects increases the chat audio volume diminishes, requiring the participants to speak more loudly and clearly to effectively communicate.

Desirable volume control effects may additionally be introduced by providing one or more specific volume control zones defined by distance thresholds relative to the position of the first virtual object, such as zones that enable either maximum or minimum chat audio volume between participants. For example, in some embodiments, a maximum threshold distance ($TD_{MAX}$) defines a zone around the first virtual object beyond which a volume of a chat audio signal will be zero. When the distance between an object associated with the first participant and an object associated with another user is greater than the maximum threshold distance, the volume level of the chat audio between the participants can be reduced to zero. This adds realism to the user experience, giving users a varied environment based on object positions within a virtual environment.

Similarly, a close-proximity area around the first virtual object can be defined by a minimum threshold distance ($TD_{MIN}$), defining a zone for maximum chat audio volume. When the second virtual object is positioned within this zone, the volume of the chat audio signal between the first and second participants is regulated at full volume. This allows the first participant to speak relatively softly into their input device yet likely be heard by the second participant due to the predetermined volume level, e.g., the full volume level, of the delivered signal. As such it might be referred to as a "whisper zone."

In an embodiment wherein both maximum and minimum volume zones are defined by respective maximum and minimum threshold distances around the first virtual object, a third zone can be defined between the maximum and minimum volume zones wherein the volume level can be adjusted as a function of the distance between the minimum threshold distance $TD_{MIN}$ and the maximum threshold distance $TD_{MAX}$.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The detailed description is described with reference to the accompanying figures. In the figures, the left-most digit(s) of a reference number identifies the figure in which the reference number first appears. The same reference numbers in different figures indicate similar or identical items.

Figure 3A:
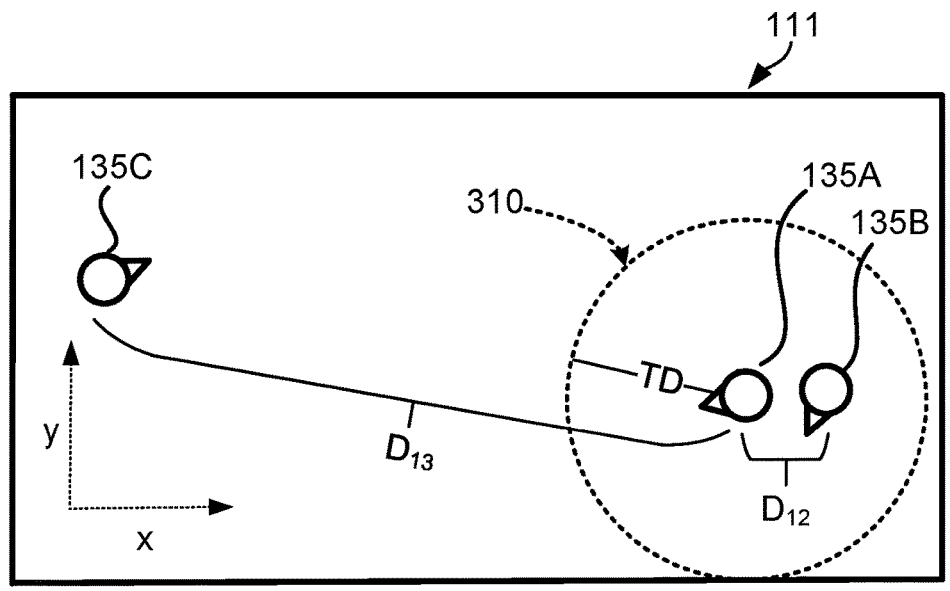
FIG. 3A illustrates a two-dimensional schematic plan view of the virtual environment of FIG. 1, showing the positions of virtual objects controlled by participants with distances from the first virtual object to second and third virtual objects.
Figure 3B:
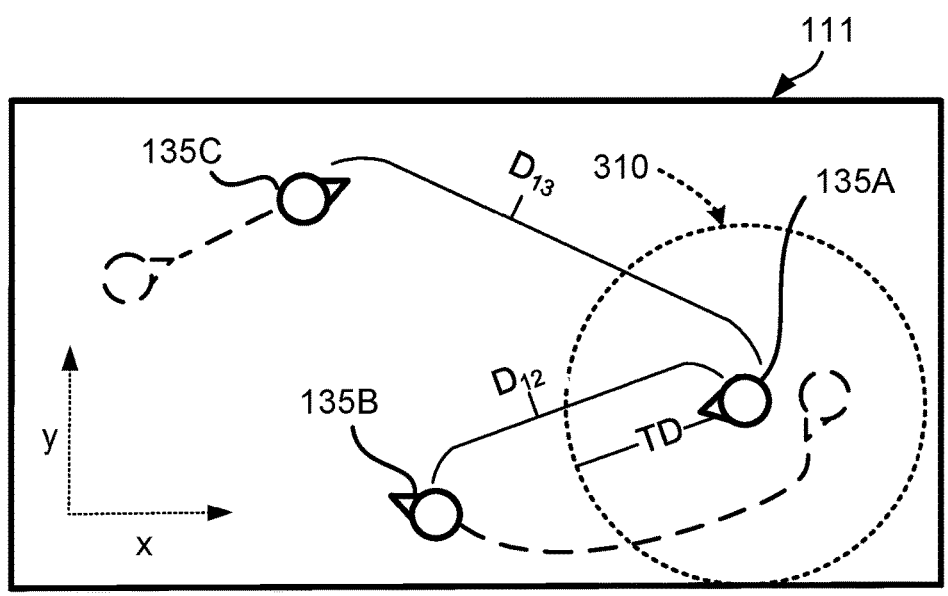
FIG. 3B illustrates the virtual environment of FIG. 3A at a later time wherein the second and third virtual objects have moved to new positions.
Figure 3C:
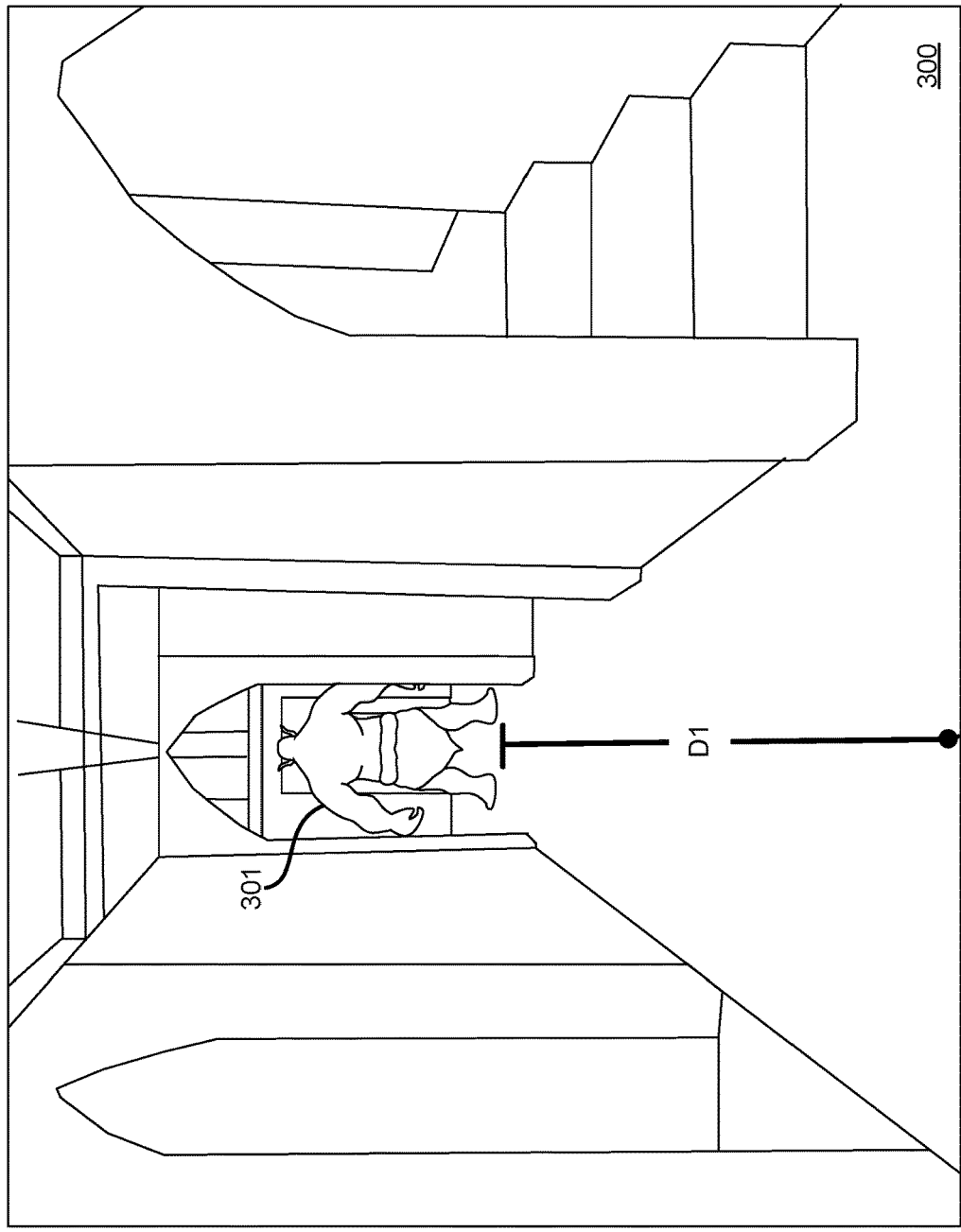
Figure 3C:
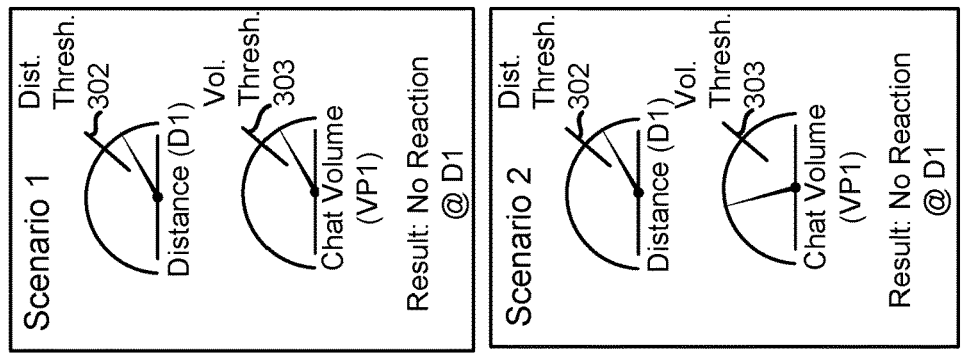

FIG. 3C includes an example user interface illustrating a rendering of a virtual environment comprising a virtual object configured to react to a voice chat input at a first distance.

Figure 3D:
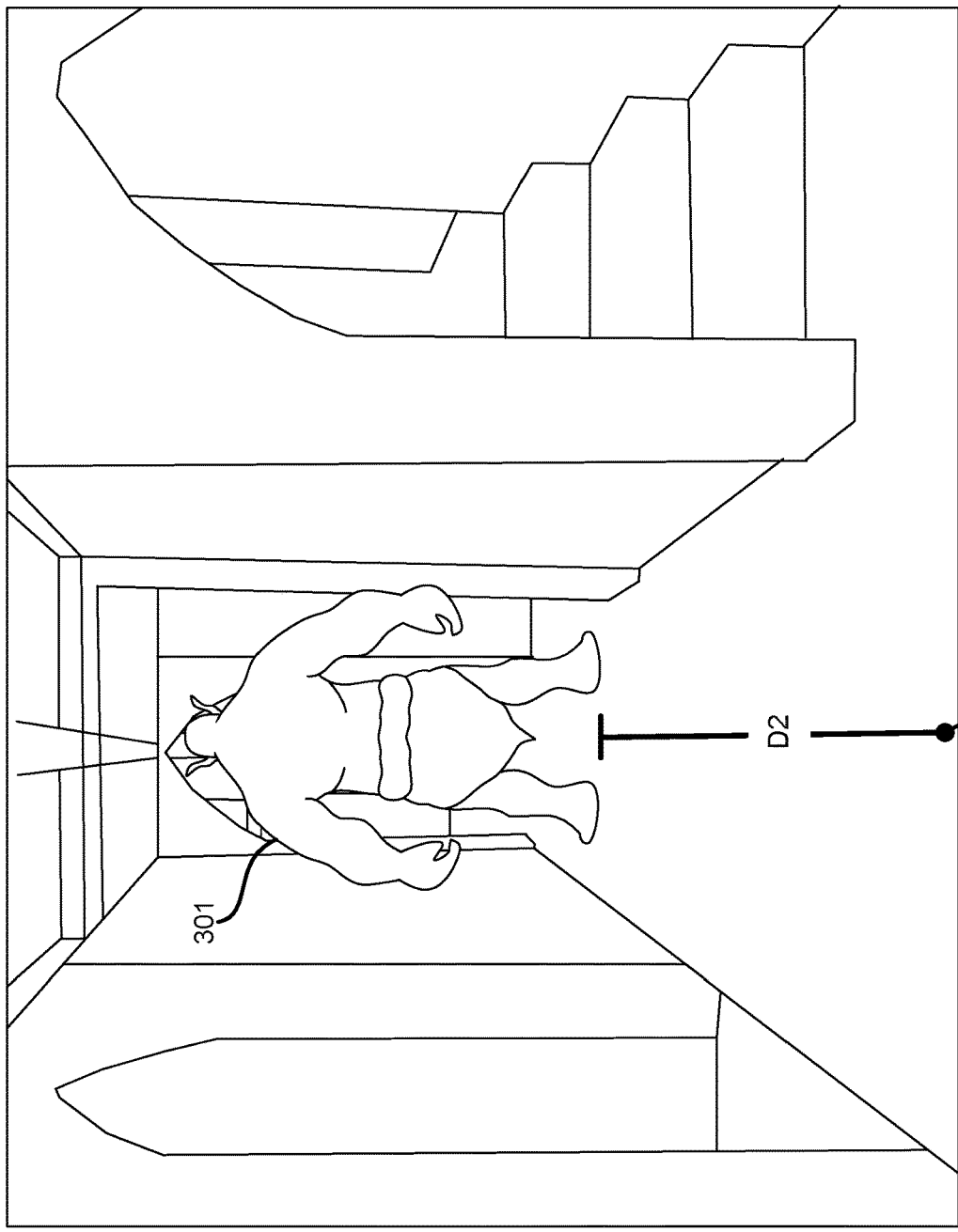

FIG. 3D includes an example user interface illustrating a rendering of a virtual environment comprising a virtual object configured to react to a voice chat input at a second distance.

Figure 3E:
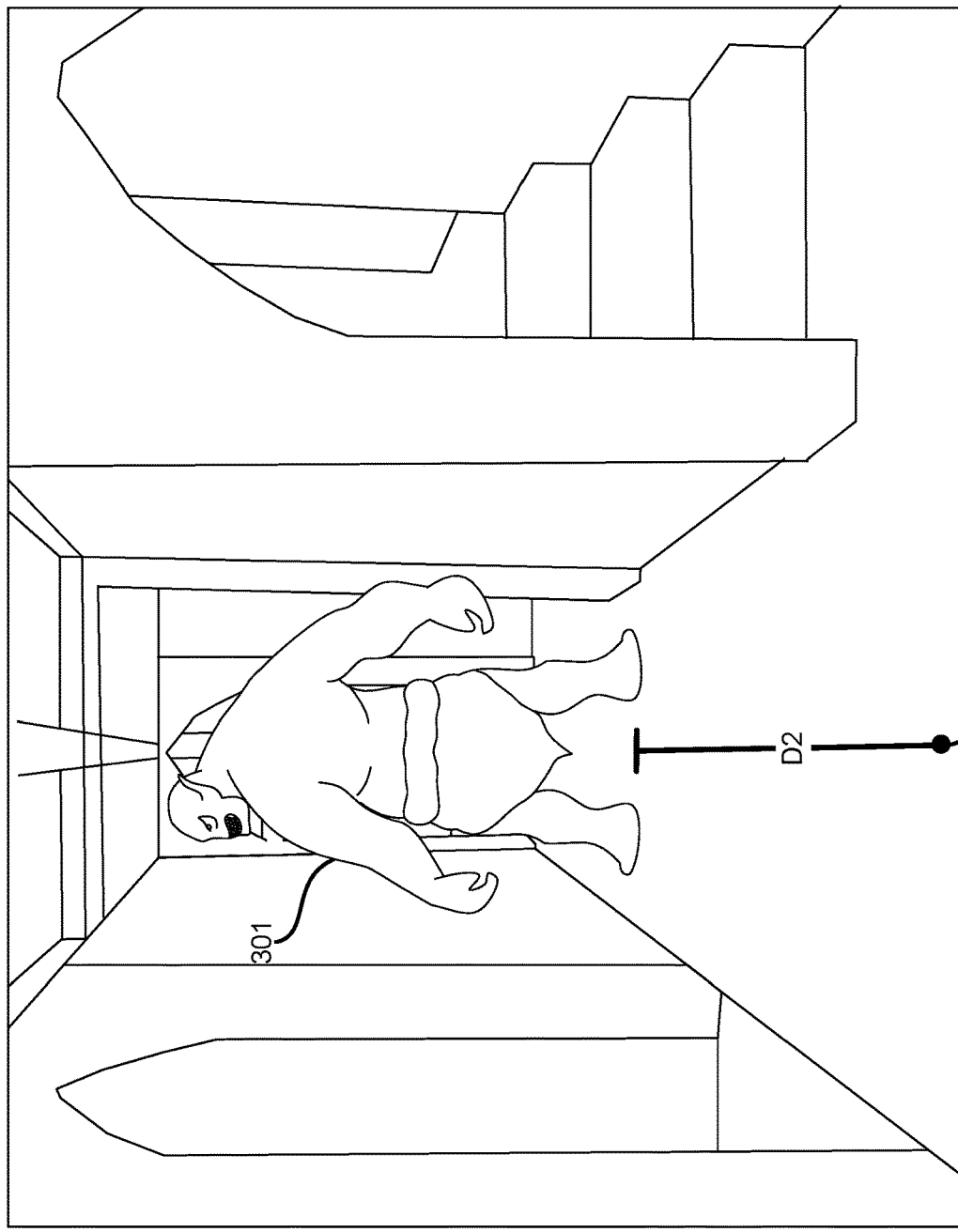

FIG. 3E includes an example user interface illustrating a rendering of a virtual environment comprising a virtual object reacting to a voice chat input at a second distance.

Figure 3F:
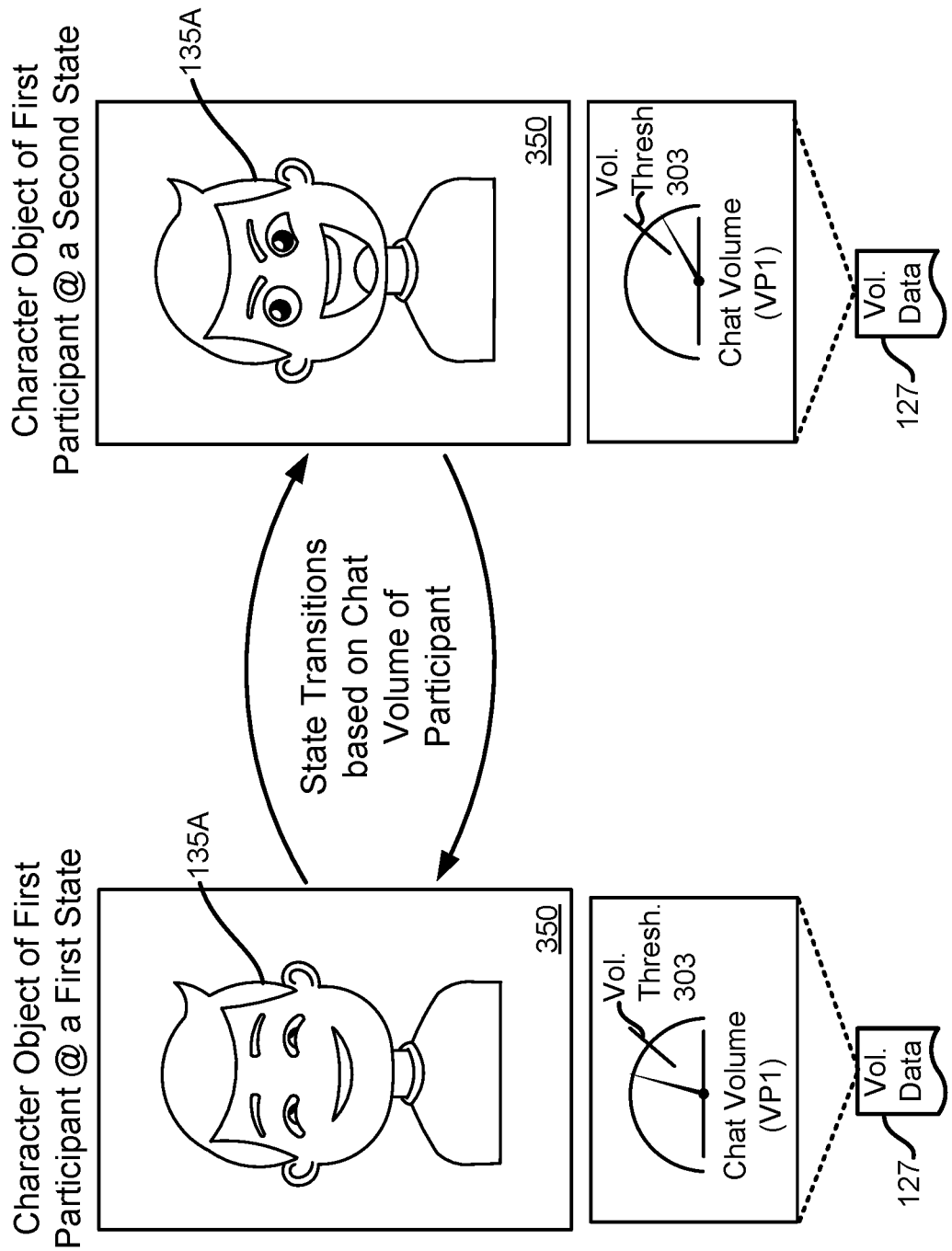

FIG. 3F includes an example user interface illustrating a rendering of virtual object configured to react to a voice chat input by performing a first gesture.

Figure 3G:
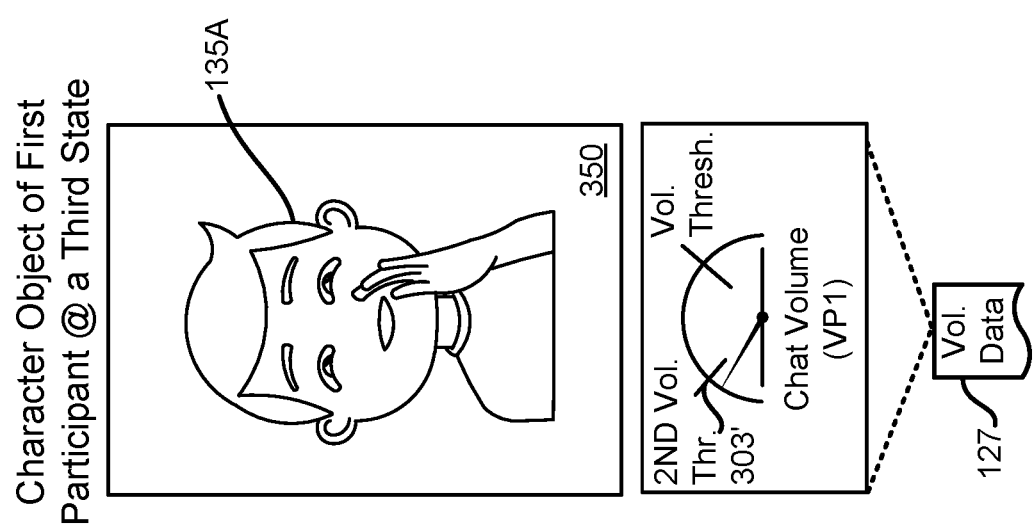

FIG. 3G includes an example user interface illustrating a rendering of a virtual object configured to react to a voice chat input by performing a second gesture.

Figure 4A:
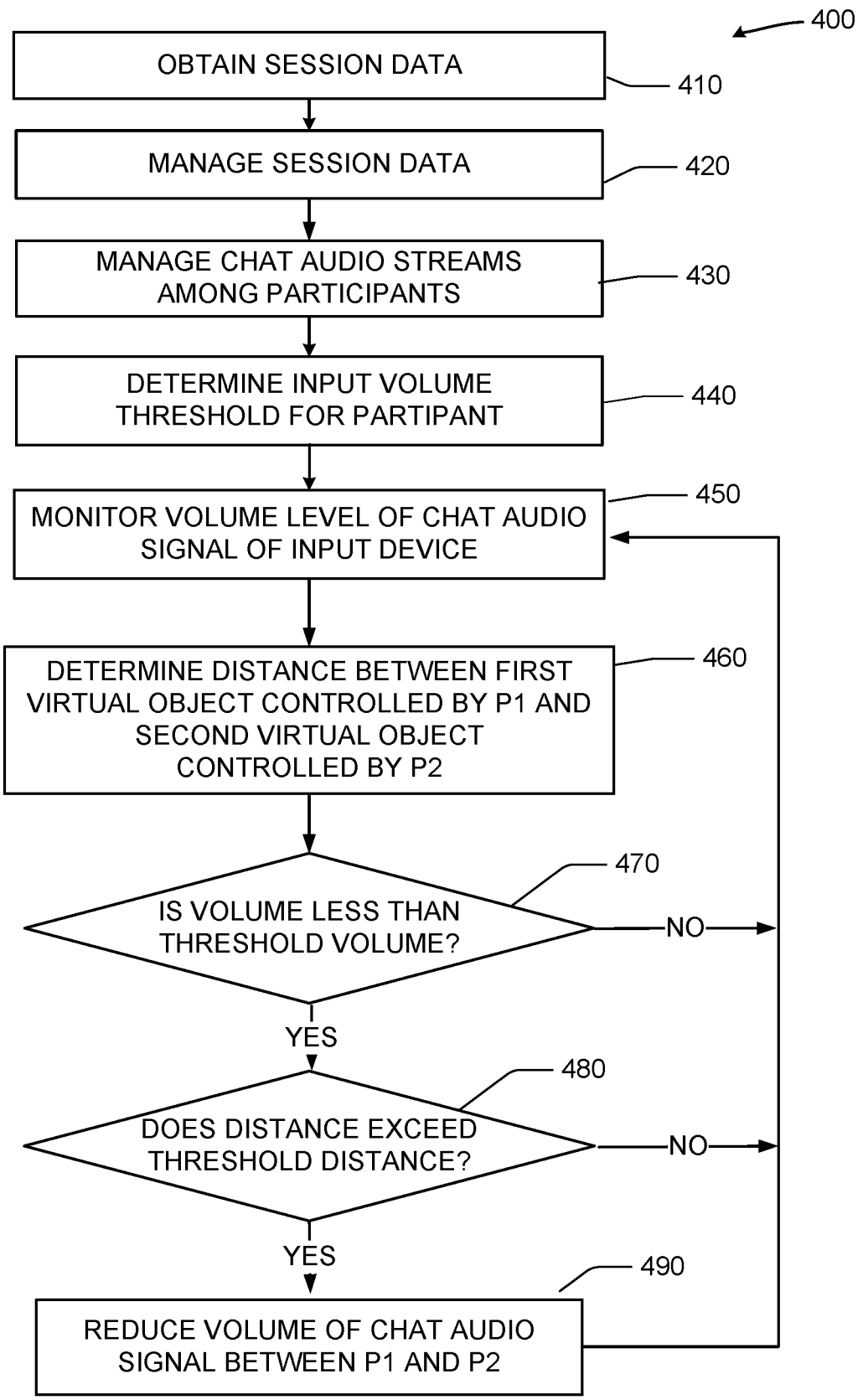

FIG. 4A illustrates a flow diagram of a routine for enabling chat volume control between participants engaged in a hosted virtual session.

Figure 4B:
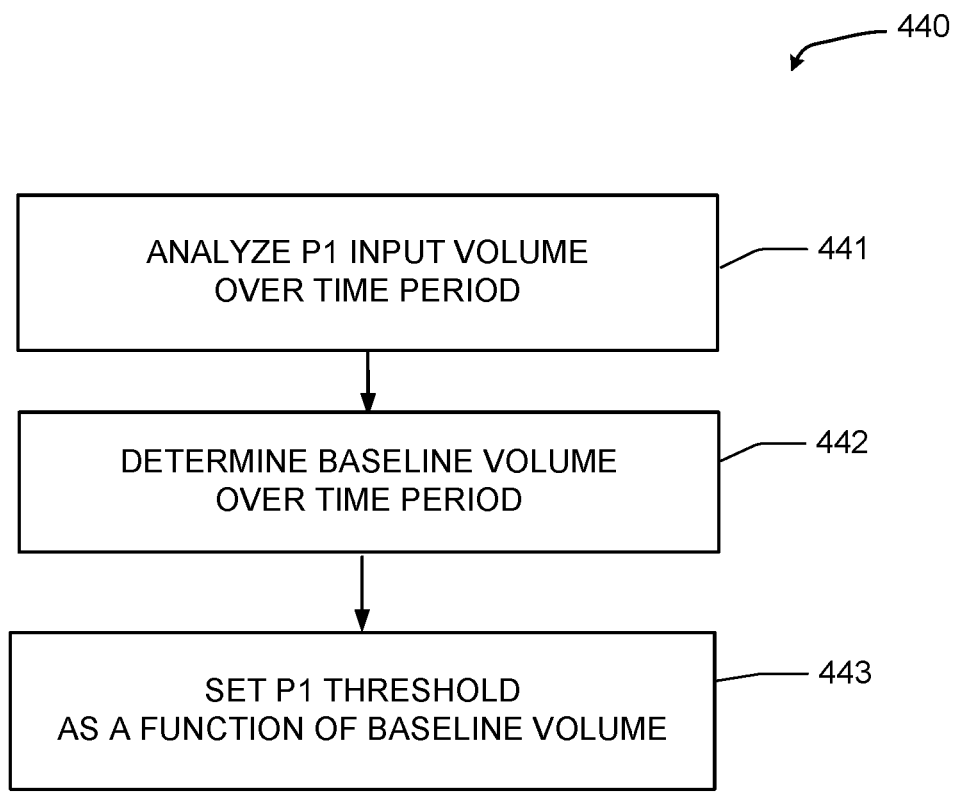

FIG. 4B illustrates a flow diagram of an optional routine for determining the threshold volume in the routine of FIG. 4A.

Figure 5:
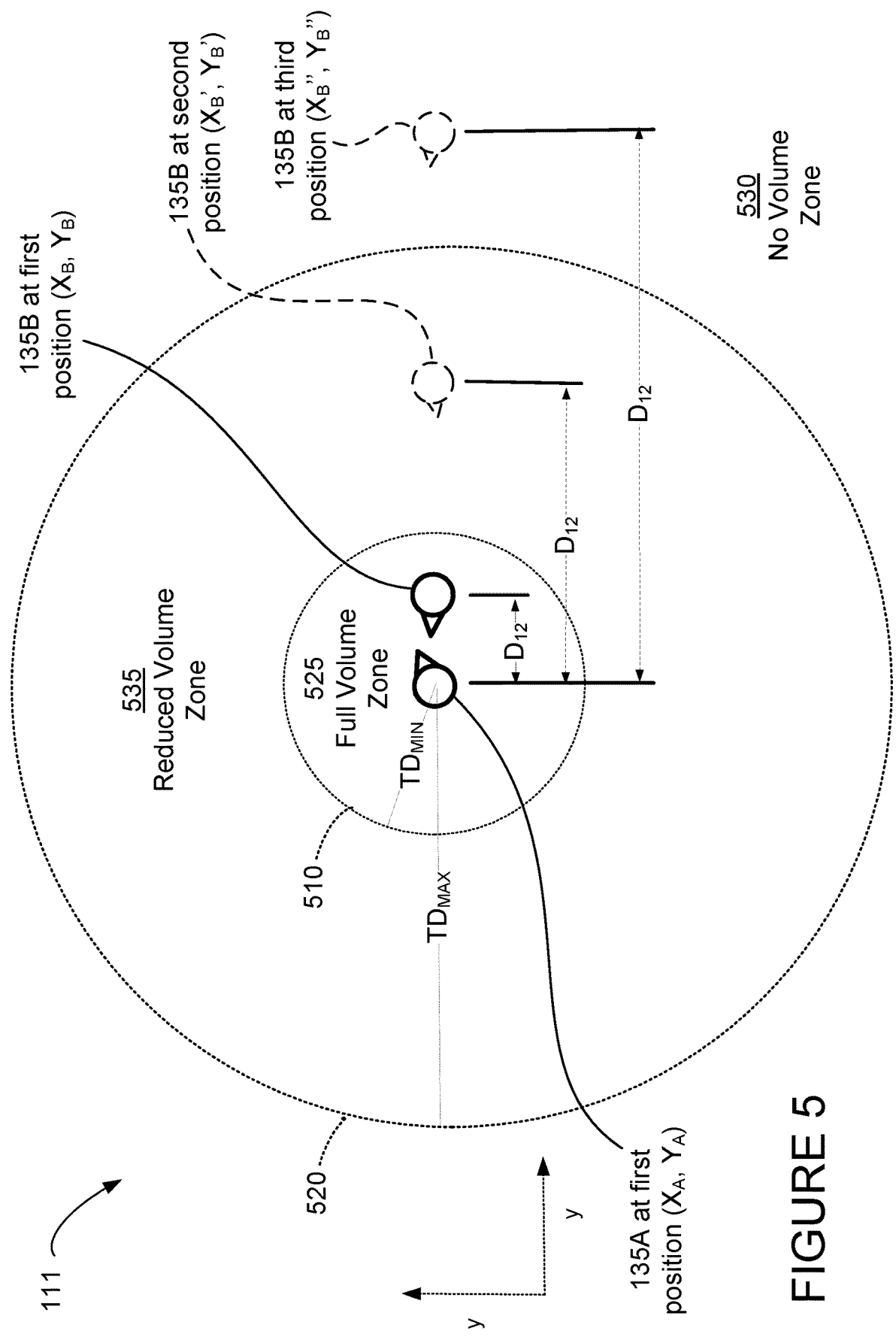

FIG. 5 illustrates a two-dimensional plan view of a virtual environment showing a first virtual object and a second virtual object positioned at multiple possible distances relative to threshold distances defining multiple chat volume control zones.

Figure 6:
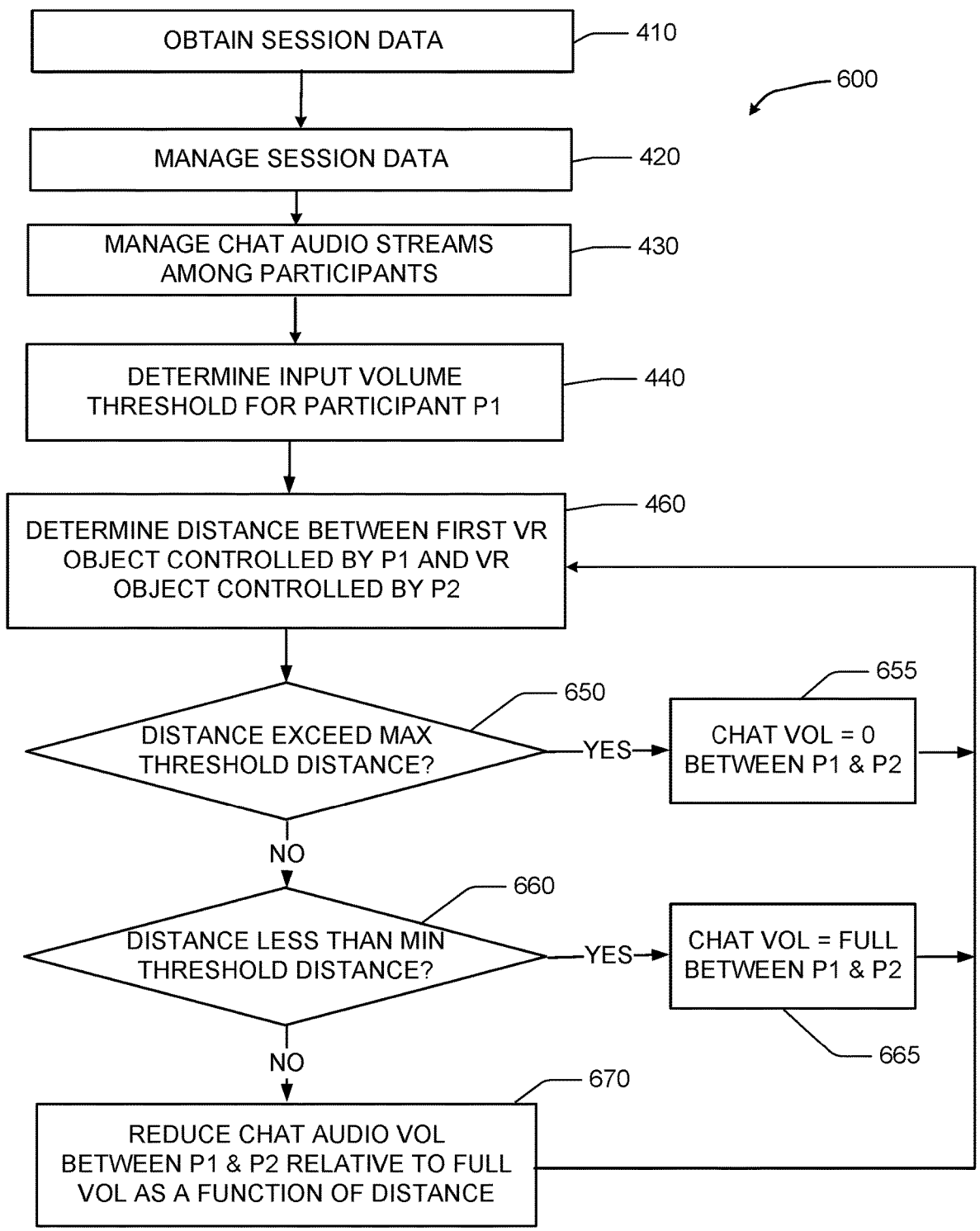

FIG. 6 is a flow diagram of an alternate routine for enabling chat volume control between participants engaged in a hosted virtual session.

Figure 7:
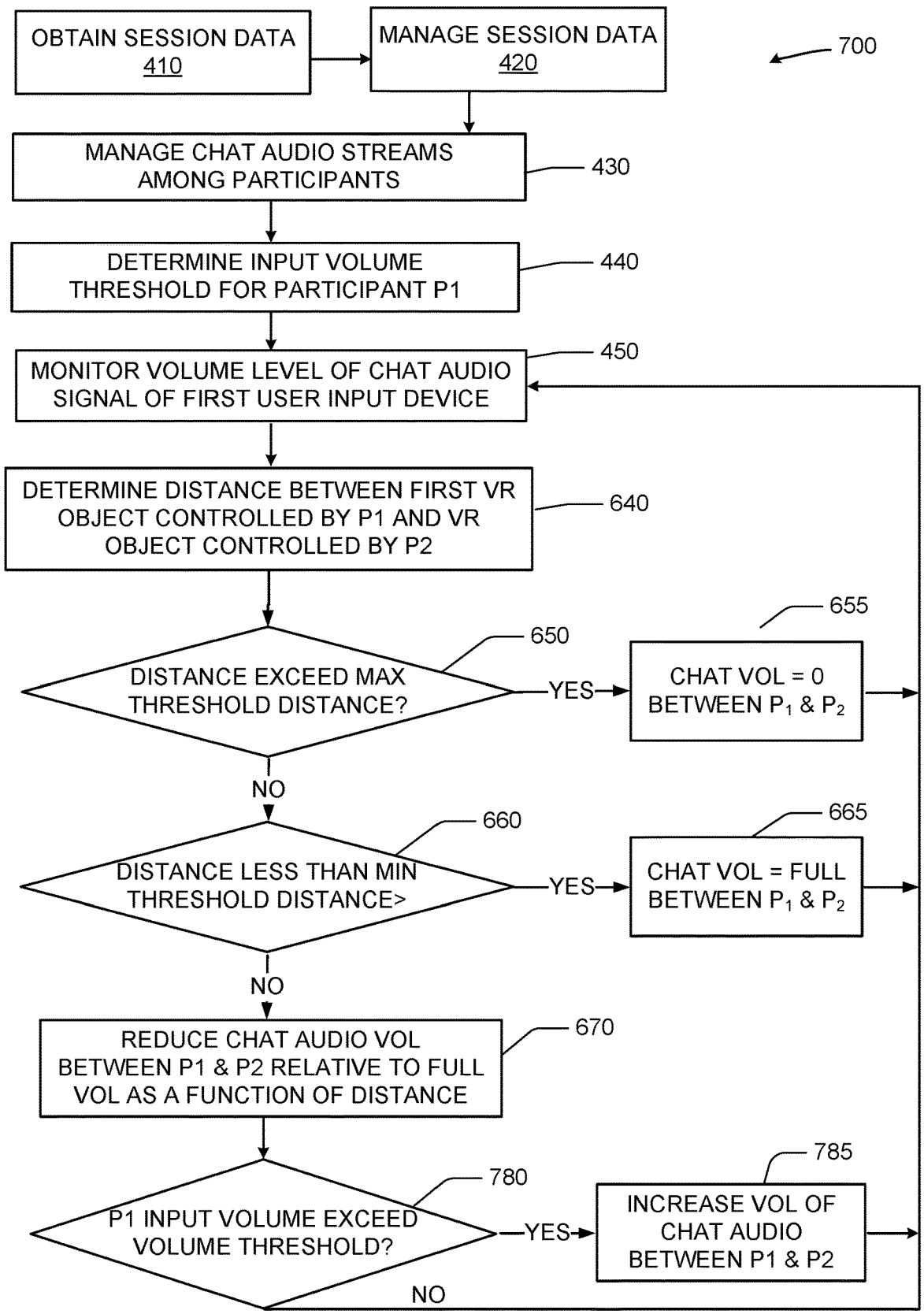

FIG. 7 is a flow diagram of another alternate routine for enabling chat volume control between participants engaged in a hosted virtual session.

Figure 8:
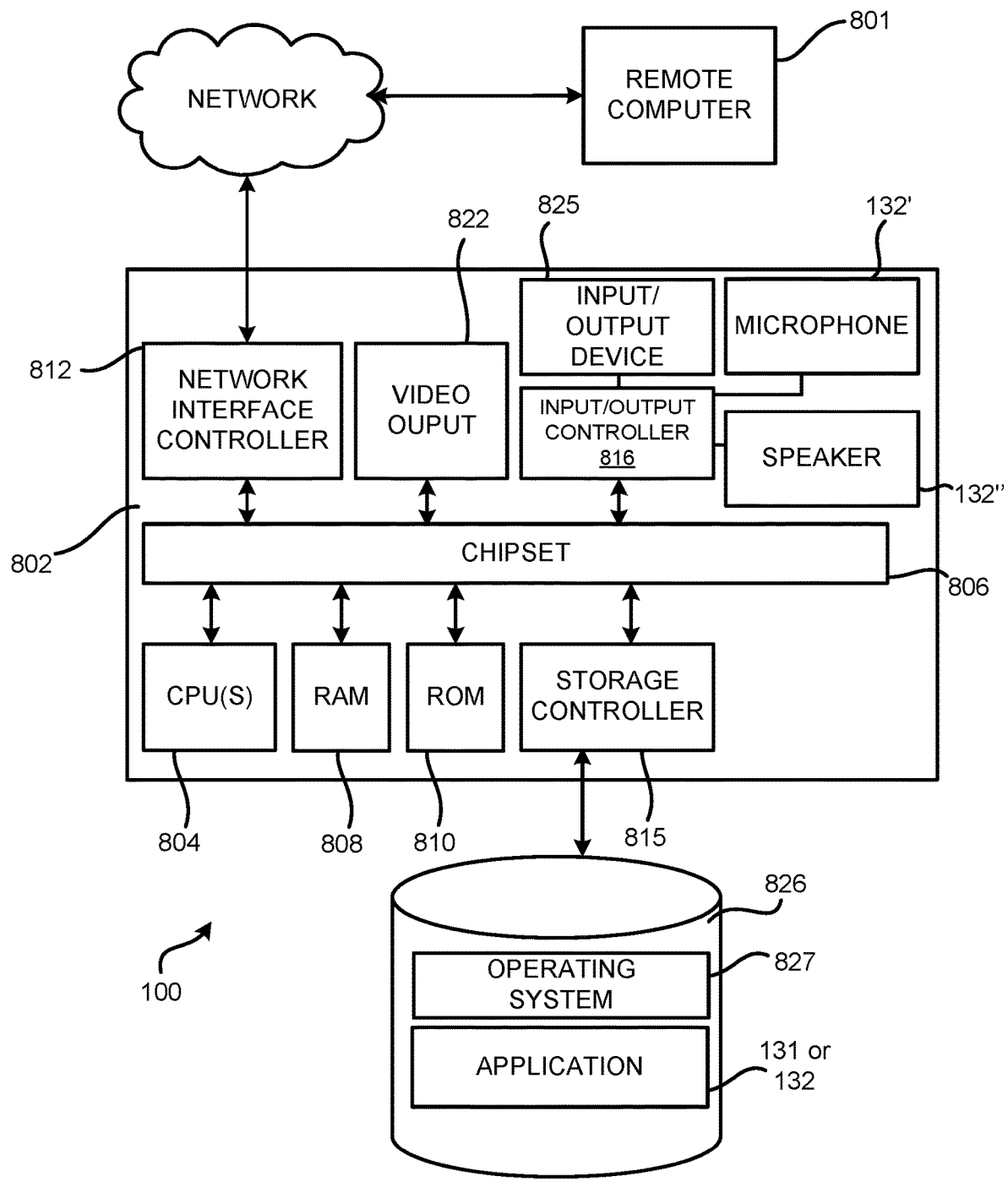

FIG. 8 is a computer architecture diagram illustrating an exemplary computer hardware and software architecture for a computing system capable of implementing aspects of the techniques and technologies described herein.

DETAILED DESCRIPTION

The techniques described herein provide audio controls for voice chat communication among multiple participants interacting with a virtual environment, in particular participants controlling respective virtual objects, such as player characters or avatars, that can move and interact within three-dimensional virtual environments. Specifically disclosed are techniques to regulate the volume of chat audio signals communicated between participants depending on various factors including a distance within the virtual environment between objects controlled by participants, and the volume of a chat audio signal generated by an input device of a participant.

The terms "volume" and "volume level" are used broadly herein to mean either audio signal intensity, a metric correlated to audio signal intensity, or a measure of the degree of loudness expected to be produced from an audio signal. Some volume controls may regulate a ratio or intensity of an audio signal, wherein the resulting a volume or volume level equates to an audio control level that varies over a range, such as 1-10, 0-100%, etc. Some volume controls may regulate a loudness metric correlated to an actual sound level, for example decibel level, expected to be produced by a device.

In general, participants can control a number of aspects of a session. For example, a session may include a game session, a virtual session, and a virtual environment can include a two-dimensional environment or a three-dimensional environment. A participant of the session can control the position of a virtual object, such as a character or avatar, within a virtual environment.

Figure 1:
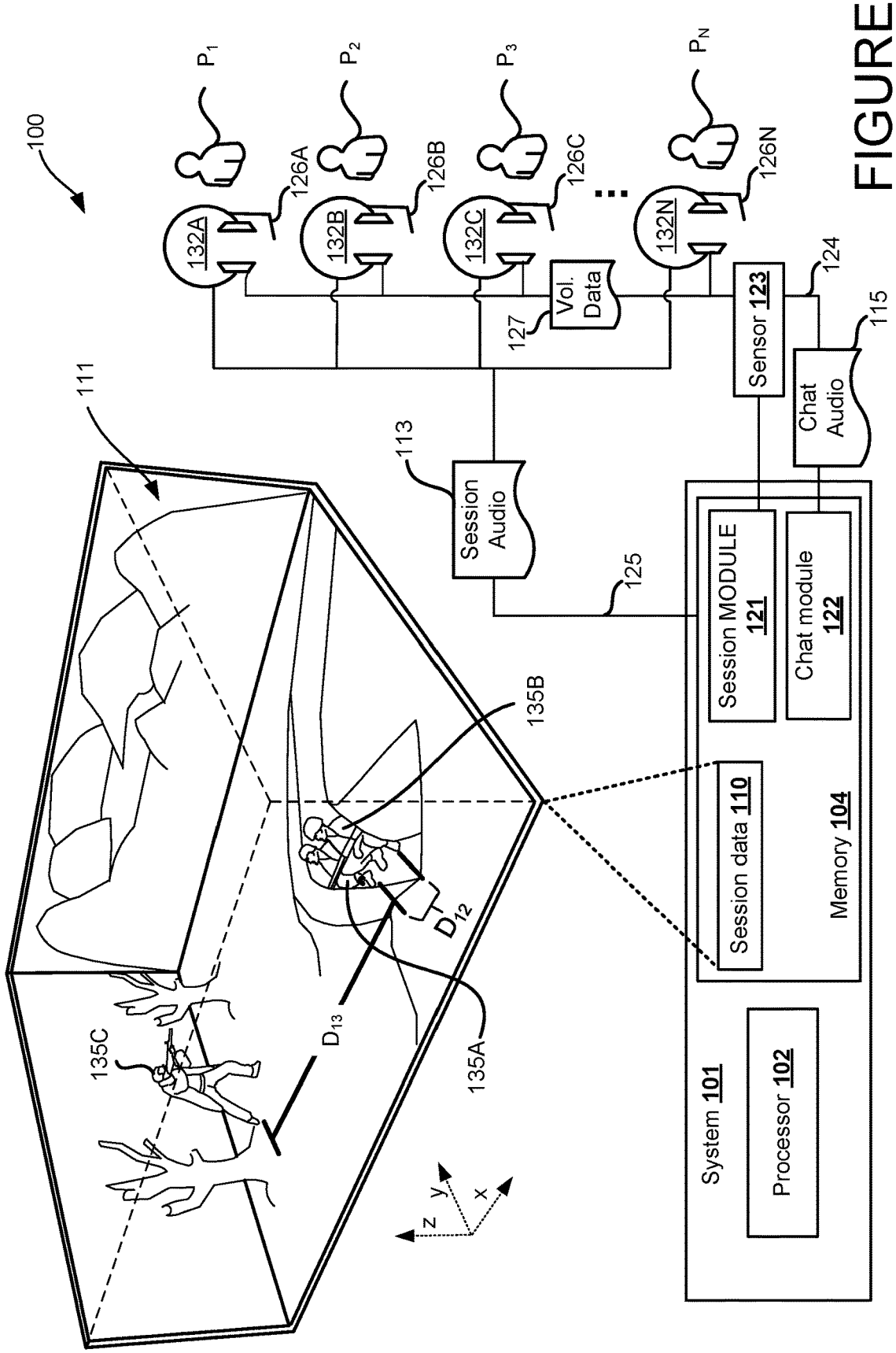
FIG. 1 illustrates aspects of an operating environment including a system for managing a three-dimensional virtual environment and chat audio signals among a plurality of participants.

Turning to the drawings, FIG. 1 is a diagram illustrating an example operating environment 100 in which a system 101 enables interaction within a virtual environment 111 by a plurality of participants $P_1$ through $P_N$, where N is an integer greater than or equal to 1. The virtual environment 111 is shown in a partial manner for illustration purposes, although it will be understood that the virtual environment 111 can be any space ranging from a small room to a large universe.

Generally, the system 101 may be a participant media system such as a computing device, gaming console, gaming system, virtual system, or other suitable system configured to provide a rich and immersive media experience for the participants $P_1$-$P_N$. The system 101 includes a processor 102, a memory 104, a session module 121, and a chat module 122.

The session module 121 manages session data 110 which defines the three-dimensional virtual environment 111 which can contain include virtual objects. For example, as illustrated in FIG. 1, virtual objects 135A, 135B and 135C are characters controlled by participants $P_1$, $P_2$, and $P_3$ respectively. Of course, although only three virtual objects 135A-C are illustrated in FIG. 1, other virtual objects also could be in the virtual environment 111 and controlled by other participants $P_N$. The session data 110 may also define non-participant virtual objects that are not controlled by the participants, but which provide environmental effects or items that can be interacted with by participants, such as buildings, vehicles, weapons, terrain, etc. In some configurations, the session module 121 can be in the form of, or part of, a game application, a virtual reality application, or an augmented reality application.

The session data 110 defines positions of objects within the virtual environment 111 using a coordinate system having three dimensions, illustrated by the x, y and z axes. The position of each object can be defined by unit coordinates of the x, y and z axes. In the illustrated example, a first virtual object 135A and a second virtual object 135B are characters positioned close together in a trench, and the third virtual object 135C is more distant. Participants $P_1$-$P_3$ can control the virtual objects 135A-135C to change positions in various ways depending on the type of virtual environment, such as by walking, running, jumping, flying, driving or riding a vehicle or moving platform, etc. The system displays views of the virtual environment to the respective participants using a respective display device, e.g., a virtual headset, a computer monitor, a television display, etc.

As the virtual objects 135A-C are moved based on control input from the participants P1-P3, respectively, the session module determines and tracks distances between the objects. With reference to FIG. 1, for example, the first virtual object 135A and second virtual object 135B are separated by a distance $D_{12}$, and the first virtual object 135A and third virtual object 135C are separated by a distance $D_{13}$.

The session module 121 also causes the generation of session audio data 113 in response to activity of the virtual objects 135A-C. Session audio data can include any sound effect or environmental sound of the virtual environment, for example, sounds of footsteps from the walking of participant or non-participant characters, vehicles, weapons, animals, weather, striking sounds, doors, devices, background music, etc.

The system 101 includes a chat module 122 that manages audio streams to enable vocal communication between a plurality of participants $P_1$-$P_N$. The chat module 122 distributes chat audio 115 among the participants $P_1$-$P_N$ separately from session module, thus the session audio 113 and chat audio 115 are distributed to participants $P_1$-$P_N$ over separate channels.

Each participant $P_1$-$P_N$ is equipped with an input and output device 132A-132N (also referred to as an "endpoint device 132") that has at least one speaker and a microphone to capture a voice audio input signal from the respective participant $P_1$-$P_N$. Each endpoint device can generate chat audio 115, which can be communicated to the chat module 122 using a first circuit 124. The first circuit 124 can be separate from a second circuit 125 that is used to communicate the session audio 113 from the session module 121 to a speaker of the end point device 132.

The speaker, such as a speaker of the headphone shown in FIG. 1, of the endpoint device 132 can be configured to receive and generate audible sounds from the session audio 113 and/or the chat audio 115. In some embodiments, the speaker can receive the signal from each circuit and mix them into a single audio output for each user to hear individually. In some configurations, each endpoint device 132 can have two speakers: a first speaker for emanating the session audio 113 and a second speaker for emanating the chat audio 115. The first speaker and second speaker can be arranged to allow a participant to concurrently hear the session audio 113 and the chat audio 115. Thus, the circuits can remain separately until they are mixed at a single speaker for a participant or each circuit can remain as a separate circuit and utilize different speakers.

In some configurations, the session module 121 can also be in communication with a sensor 123 configured to measure the volume of any individual participant providing chat audio 115. In some configurations, each microphone 126 and/or the sensor 123 can also be configured to generate volume data 127 indicating the volume of the voice of each participant providing a voice input. The volume data 127 can be communicated to the session module 121 and the chat module 122 by the first circuit 124. The volume data 127 can be used by the session module 121 or the chat module 122 to determine if the volume of a participant's voice exceeds, meets, or does not exceed a threshold. The chat module 122 can also determine the volume of each participant's voice by the use of voice recognition software. Thus, the voice of one participant can be detected by the use of profile data, and the volume of that participant can be detected and compared against a threshold. The endpoint devices 132 illustrated as headsets are provided as an example of hardware capable of capturing and delivering audio data, although it will be understood that other audio input and output hardware would be suitable.

Figure 2:
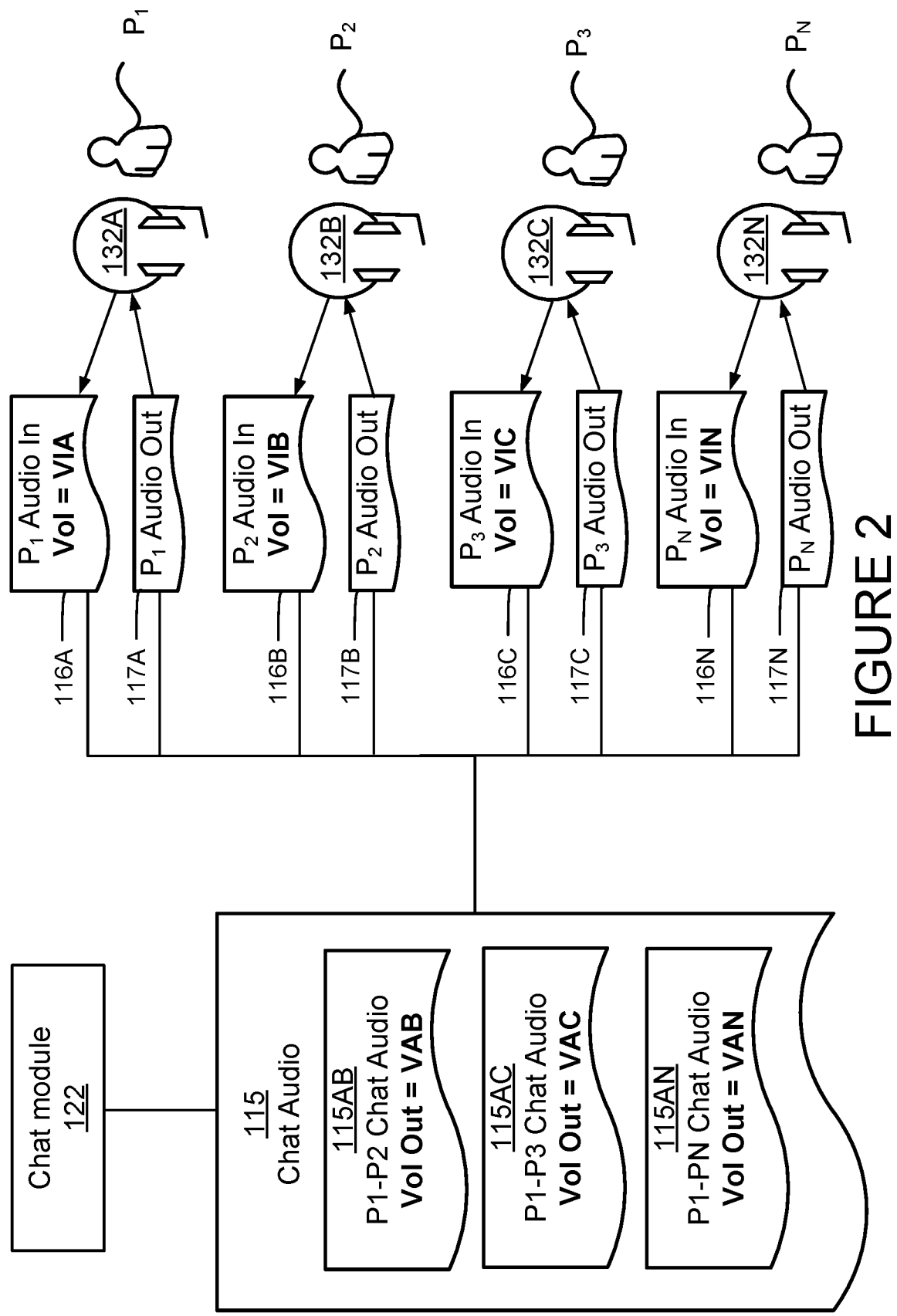
FIG. 2 illustrates in greater detail the chat module of the system of FIG. 1 managing the chat audio streams among a plurality of participants.

FIG. 2 illustrates greater detail of the chat module 122 and chat audio stream 115 as distributed among the participants $P_1$-$P_N$. The chat audio stream 115 separately manages audio between respective chat pairings of the participants $P_1$-$P_N$. As illustrated from the perspective of participant P1, for example, the chat audio stream 115 includes separate chat audio 115AB reflecting chat communication between participants $P_1$-$P_2$, chat audio data 115AC reflecting chat communication between participants $P_1$-$P_3$ and 115AN reflecting chat communication between participants $P_1$-$P_N$.

Voice input from the respective input devices 132A-N is illustrated as chat audio input 116A-N, delivering captured voice audio signals of the respective participants $P_1$-$P_N$ to be processed by the chat module 122 as part of the chat audio 115. In an embodiment, as voice input is captured from each participant $P_1$-$P_N$ a respective audio input volume VIA, VIB, VIC, VIN is also determined and reflected by the chat audio input 116A-N. The chat audio 115 includes separate chat audio output 117A-N as delivered to the respective input devices 132A-N, allowing each participant $P_1$-$P_N$ to hear chat audio at a relative volume controlled by the chat module 122.

The chat module 122 separately controls the volume of chat audio communications among specific participants. For example, each component 115AB, 115AC, 115AN of the chat audio stream 115 has a specified volume out, VAB, VAC, VAN, respectively, shown in FIG. 2. The volume control techniques are described below. The following section, in conjunction with FIGS. 3A through 3G, describes a number of scenarios where a voice chat input, which can be combined with other types of input, can be used to control aspects of a virtual environment.

The chat audio volume control techniques among participants to be described herein consider the relative proximity of virtual objects within the virtual environment. Illustrating this, FIGS. 3A and 3B show, in two dimensions, positions of virtual objects 135A, 135B, and 135C relative to x and y axes within the virtual environment. Based on these positions, relative distances between virtual objects are determined and monitored within the virtual environment 111. With reference to FIG. 3A, for example, first virtual object 132A and second virtual object 132B are separated by distance $D_{12}$, and virtual objects 132A and 132C are separated by distance $D_{13}$.

A threshold distance TD from virtual object 135A is also shown in FIG. 3A, defining a boundary 310 around the virtual object 135A. The system 101 (FIG. 1) determines whether other virtual objects are within the threshold distance TD from the first virtual object 135A. In the example illustrated in FIG. 3A, the first virtual object 135A and second virtual object 135B are relatively positioned such that the distance $D_{12}$ between them is less than the threshold distance TD. The position of the third virtual object 135C is such that the distance $D_{13}$ is greater than the threshold distance TD, thus the third virtual object 135C is outside the boundary 310. Thus, in this example, the chat communication between the first participant P1, controlling the first virtual object 135A, and the second participant P2, controlling the second virtual object 135B, can be maintained. However, the chat communication between the first participant P1 and the third participant P3, controlling the third virtual object 135C, can be reduced in volume or terminated when the volume of the first participant P1 is below a volume threshold and when the distance between the virtual objects exceed a threshold distance. In some embodiments, the chat communication between the first participant P1 and the third participant P3 can be reduced in volume or terminated when the distance between the virtual objects exceed a threshold distance.

FIG. 3B shows the virtual environment 111 when the second virtual object 135B and 135C have moved to new positions relative to their positions in FIG. 3A, the motion from original positions shown by dashed lines, such that the distances $D_{12}$ and $D_{13}$ have changed. As illustrated, the second virtual object 135B has moved such that the distance $D_{12}$ from the first virtual object 135A is a greater than the threshold distance TD, thus being outside the boundary 310. The third virtual object 135C has moved along a path such that the distance $D_{13}$ is smaller than in FIG. 3A, but distance $D_{13}$ is still less than the threshold distance TD. The system 101 (FIG. 1) continues to monitor the relative distances $D_{12}$ and $D_{13}$ over time as virtual objects 135A, 135B and 135C may move. Thus, in this example, by the position of each of the virtual object, e.g., that the second virtual object 135B has moved such that the distance $D_{12}$ from the first virtual object 135A is a greater than the threshold distance TD, the system may reduce the volume or terminate the chat communication between the first participant P1 and the second participant P2, and also reduce the volume or terminate the chat communication between the first participant P1 and the third participant P3.

Although FIGS. 3A and 3B are shown as spaced in two dimensions along x and y axes for ease of explanation, it will be understood that the objects could also be spaced from each other three dimensions, such as if the virtual objects were at different elevations relative to the z axis (FIG. 1), in which case the distances and threshold distances would be calculated to account for spacing on x, y, and z coordinates.

FIG. 3C through FIG. 3G illustrate a number of different actions that can be performed by a computer-controlled virtual object in response to a change in volume of a chat audio signal. FIG. 3C includes an example user interface illustrating a rendering virtual environment 300 comprising a virtual object 301 configured to control a reaction relative to a voice chat input. In this example, the virtual object 301 is positioned at a first distance D1 from the location of the participant object 135A, e.g., a position of a character object controlled by a participant. In this scenario, the techniques disclosed herein can control the reaction of the virtual object 301 based on a number of factors. For instance, in a first scenario, when the distance D1 exceeds a distance threshold 302 and when the chat volume exceeds a volume threshold 303, the system may control the reaction of the virtual object 301 such that the virtual object 301 does not react to the chat audio input of the participant.

In a second scenario, when the distance D1 exceeds a distance threshold 302 and when the chat volume does not exceed a volume threshold 303, the system may control the reaction of the virtual object 301 such that the virtual object 301 does not react to the chat audio input of the participant. In such configurations, a computer-implemented routine may prevent a chat audio input from interrupting a pre-existing routine controlling the actions of the virtual object 301.

As shown in FIG. 3D, in third scenario, when the distance D2 is below a distance threshold 302 and when the chat volume is below a volume threshold 303, the system may control the reaction of the virtual object 301 such that the virtual object 301 does not react to the chat audio input of the participant. In such configurations, a computer-implemented routine may prevent a chat audio input from interrupting a pre-existing routine controlling the actions of the virtual object 301.

As shown in FIG. 3E, in fourth scenario, when the distance D2 does not exceed a distance threshold 302 and when the chat volume exceeds a volume threshold 303, the system may control the actions of the virtual object 301 to react to the chat audio input of the participant. In such configurations, a computer-implemented routine may cause the computer-controlled virtual object 301 to express a gesture indicating that the computer-controlled virtual object has detected a presence of the user-controlled virtual object.

In another example, a computer-implemented routine may cause the computer-controlled virtual object to perform a gesture that is indicated by the vocal input of the participant. In one illustrative example, the vocal input of the participant may include an instruction for the virtual object 301 to follow. For instance, by using the chat audio input, e.g., when the distance D2 does not exceed a distance threshold 302 and when the chat volume exceeds a volume threshold 303, a user can instruct a virtual object to move in a particular direction, display a particular expression, etc. However, when the distance D2 exceeds a distance threshold 302 and/or when the chat volume does not exceed the volume threshold 303, user's voice instructs for the virtual object may be ignored or a probability of an execution of the user's voice instructions may be reduced.

In some configurations, a computing device can control the probability of a particular action or a particular inaction. For instance, a computing device can reduce a probability of the performance of a gesture when the volume of the chat audio signal does not exceed the volume threshold. In another example, a computing device can reduce a probability of the performance of the gesture when the position of the computer-controlled virtual object is not within the threshold distance of the position of the user-controlled virtual object.

For illustrative purposes, a method applied to the example of FIG. 3E can comprise an operation for receiving session data 110 defining the virtual environment 111. The session data 110 can define a position of a computer-controlled virtual object 301 and a position of a user-controlled virtual object 135A. The position of the user-controlled virtual object 135A can be based, at least in part, on an input from a participant P1 controlling the user-controlled virtual object 135A via an input device such as a game controller, a touch pad, a keyboard, mouse, etc. The session data 110 can cause the generation of session audio data 113 that is coordinated with activity of the computer-controlled virtual object 301. For instance, the sound of the computer-controlled virtual object 301 can be generated as an output using a session audio engine, such as a game engine or a virtual reality engine.

The method can also include an operation for receiving and/or managing a chat audio signal 115 that provides vocal communication between the participant P1 and a plurality of participants P2-PN. As described herein, the chat audio signal 115 can be communicated by the use of a system or a circuit that is separate from a system or a circuit that manages the session audio data 113. The session audio data 113 and the chat audio signal 115 can be mixed to a single speaker or the session audio data 113 and the chat audio signal 115 can communicated to one or more users using separate speakers.

The method can also include an operation for determining if a volume VP1 of the chat audio signal 115 has a change with respect to a volume threshold 303. In some configurations, the chat audio signal 115 can be generated from a vocal input of a participant P1 at an input device 132A, such as a microphone.

The method can also include an operation for determining that the position of the computer-controlled virtual object 301 is within a threshold distance 302 of the position of the user-controlled virtual object 135A. In response to determining that the volume of the chat audio signal 115 that provides vocal communication between the participant P1 and the plurality of participants P2-PN exceeds the volume threshold 303 and determining that the position of the computer-controlled virtual object 301 is within the threshold distance 302 of the position of the user-controlled virtual object 135A, the method can execute an action to be performed by the computer-controlled virtual object 301. As described above, the action to be performed by the computer-controlled virtual object 301 can include the generation of a rendering of the virtual object 301 displays a particular expression, e.g. that a character object is reacting to the presence of the user-controlled virtual object 135A, following directions that are communicated within the voice input, etc.

The computing device can reduce a probability of the performance of the gesture when the volume of the chat audio signal does not exceed the volume threshold. The computing device can reduce a probability of the performance of the gesture when the position of the computer-controlled virtual object is not within the threshold distance of the position of the user-controlled virtual object.

Turning now to FIG. 3F and FIG. 3G, other examples of a virtual object that can be modified based on a user input is shown and described below. In these examples, an expression property of a virtual object can be modified based on a volume of a voice input of a chat audio signal. As described herein, the volume level of a participant's voice can be defined in volume data 127, which can be generated by a sensor.

FIG. 3C includes an example user interface illustrating a rendering a virtual object, such a character object 135A. The location of the character object 135A within a virtual environment can be controlled by an input of a participant via a controller device. The techniques disclosed herein can control an expression of the character object 135A by monitoring the chat volume of the participant relative to one or more volume thresholds 303. As shown, in a first state, the character object 135A can be configured to portray a first expression. When the system detects that the chat volume VP1 transitions to a level above a volume threshold 303, the system can modify the expression of the character object, e.g., any virtual object. In this example, the system modifies the rendering of the character object 135A to include an expression indicating that the virtual object is talking at an increased volume, e.g., yelling, when the volume of the chat audio signal is above the volume threshold. In this example, the system can transition the rendering back to the first state from the second state when the volume of the chat audio signal transitions to a level below the volume threshold 303. As shown in FIG. 3G, the system can modify the rendering of the character object 135A to include an expression indicating that the virtual object is talking at a reduced volume, e.g., whispering, when the volume of the chat audio signal is below a volume threshold. In this example, a third state involving an expression that the character object 135A is talking at a reduced volume can be displayed when the volume of the chat audio signal is below a second volume threshold 303'. These examples are provided for illustrative purposes and is not to be construed as limiting, the any expression can be rendered based on a volume level that is above or below any threshold.

In addition, other actions can be executed based on a volume of a chat audio signal. For instance, an expression property of a virtual object can be modified when a volume of a chat audio signal of an associated user exceeds or does not exceed a threshold. An expression property can include any feature of an expression such as a level in which a character object opens or closes its eyes or mouth, or to an extent that a character object smiles or movies their arms or hands. In one illustrative example, a system may modify an expression property such that a character object appears to be opening their eyes and mouth to a higher degree when a volume of a chat audio signal of a particular user exceeds a threshold. It can also be appreciated that any of the examples described herein can be combined to operate in a coordinated fashion. For instance, the examples of FIG. 3C through FIG. 3G can implemented using any combination of the features described herein. Thus, the chat input volume from a first participant and/or a distance between virtual objects can influence the chat communication between one or more participants, influence the actions of a computer-controlled virtual object or influence actions and/or expressions of a user-controlled virtual object.

In one illustrative example, a computer-implemented method for controlling an expression property of a virtual object 135A of a virtual environment 111 can include an operation for receiving session data 110 defining the virtual environment 111. The session data 110 can define a position of the virtual object 135A that is controlled by an input from a participant P1 by an input controller (816 of FIG. 8). The session data, when processed by a system, can cause a generation of session audio data 113 that is coordinated with movement of the virtual object 135A. The computer-implemented method can also include an operation for receiving a chat audio signal 115 that provides vocal communication between the participant P1 and a plurality of participants P2-PN. The computer-implemented method can also include an operation for determining that a volume VP1 of the chat audio signal 115 generated from a vocal input of the participant P1 at an input device 132A has a change with respect to a volume threshold 303. In response to determining that the volume of the chat audio signal 115 that provides vocal communication between the participant P1 and the plurality of participants P2-PN has changed with respect to the volume threshold 303, modifying the expression property of virtual object 135A. In some configurations, modifying the expression property of the virtual object can include modifying a rendering of the virtual object to include an expression indicating that the virtual object is talking at a reduced volume, e.g., whispering, when the volume of the chat audio signal is below the volume threshold.

In some configurations, the computer-implemented method can include an operation for modifying a rendering of the virtual object to include an expression indicating that the virtual object is talking at an increased volume when the volume of the chat audio signal is above the volume threshold. A computing system can transition the virtual object from any first expressions to any second expression, using any combination of thresholds. For instance, a method can include transitioning the rendering of the virtual object, either the first state or the second state of FIG. 3F, to a second rendering of the virtual object to include a second expression indicating that the virtual object is talking at a reduced volume when the volume of the chat audio signal transitions below a second volume threshold 303'.

Hereinafter, a more detailed discussion of the operation of the systems and components described above is provided with reference to flow diagrams. As illustrated in FIGS. 4A, 4B, 6 and 7 aspects of a routines 400, 600 and 700 to provide chat volume control is shown and described. It should be understood that the operations of the routines and methods disclosed herein are not necessarily presented in any particular order and that performance of some or all of the operations in an alternative order(s) is possible and is contemplated. The operations have been presented in the demonstrated order for ease of description and illustration.

Operations may be added, omitted, and/or performed simultaneously, without departing from the scope of the appended claims.

It also should be understood that the illustrated routines can end at any time and need not be performed in their entireties. Some or all operations of the routines, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 400, 600 and 700 are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data, such as the audio data, 360 canvas and other data, can be stored in a data structure in one or more memory components. Data can be retrieved from the data structure by addressing links or references to the data structure.

Although the following description refers to the components of FIG. 1 and FIG. 2, it can be appreciated that the operations of the routines 400, 600, and 700 may be also implemented in many other ways. For example, the routines 400, 600, and 700 may be implemented, at least in part, by a processor of another remote computer or a local circuit. In addition, one or more of the operations of the routines 400, 600, and 700 may alternatively or additionally be implemented, at least in part, by a chipset working alone or in conjunction with other software modules. Any service, circuit or application suitable for providing the techniques disclosed herein can be used in operations described herein.

FIG. 4A is a flow diagram of a routine 400 of providing chat audio volume control among participants controlling virtual objects within a virtual environment. The routine 400 begins at operation 410 wherein a system obtains, e.g., receives or generates, session data defining a three-dimensional virtual environment. In some embodiments, the session data defines coordinates of defining positions of a virtual object within the virtual environment and defines views displayed to participants controlling the virtual objects. Next, at operation 420, the session data is managed, including moving the virtual objects as controlled by respective participants, which may include changing positions within the virtual environment relative to the coordinates.

At operation 430, the system manages chat audio streams among participants. This includes establishing chat audio communication among participants as described above in connection with FIG. 2, including receiving input chat audio data from each participant equipped with an input device.

At operation 440, the system determines an input volume level for the input device of the first participant. This may be receiving a stored threshold value, such as a decibel (dB) value or a fixed proportion of a signal value. Optionally, operation 440 may include operations 441-443 as illustrated in FIG. 4B. With reference to FIG. 4B, operation 440 includes operation 441 in which a volume of participant P1 input audio is analyzed over a time period. For this, a microphone of the input device captures voice audio signals from the participant P1 over the time period, including a volume level of the input audio signal. At operation 442, a baseline volume is determined. The baseline can be, for example, an average volume level over the sample, or a margin above the average level. Other signal analytics can be used, such as determining high volume points over the sample and filtering points assumed to be noise or anomalies. Then, at operation 443 the input volume threshold as a function of the baseline volume is determined. This may include adding a predetermined margin (e.g., 5, dB, 10 dB, etc.), to the baseline volume or setting the threshold as a proportion (e.g. 125%, 200%, etc) of the baseline volume.

Turning back to FIG. 4A, at operation 450 the system monitors the volume level of chat audio signals from the input device of the users or participants such as the first participant $P_1$. The system also determines a distance between the virtual objects controlled by the users or participants. More specifically, at operation 460, a distance is determined between the first virtual object and second virtual object controlled by the first user and second user, respectively.

At operation 470, the system determines if the volume monitored from the input device of the first participant is less than the threshold volume. If operation 470 determines that the volume is not less than the threshold volume, the routine 400 continues monitoring the volume at operation 450.

At operation 480, the system determines if the distance between the first virtual object and second virtual object exceeds a distance threshold. If the distance does not exceed the distance threshold, the routine continues to monitor the volume at operation 450.

If operation 470 determines that the volume is less than the threshold volume and operation 480 also determines that the distance exceeds the threshold distance, at operation 490 the volume of a chat audio between the first participant and second participant is reduced. Volume may be reduced at operation 480 in various possible ways. For example, in an embodiment, the reduction is applied only to volume of chat audio output, such as output volume VAB of the P1-P2 chat audio 115AB of FIG. 2. The volume may be reduced by decreasing an overall level or magnitude of all chat audio signals communicated between the first and second participants. This reduction could be a step reduction, such as a percentage or predetermined level amount, or it could be based on an algorithm Such an algorithm could, for example, be based on the distance between the virtual objects and/or the input volume. In another implementation, the reduction results in no chat communication between the first and second participants, e.g., a zero volume level of chat audio or no signal.

In some embodiments, multiple thresholds can be used to define multiple zones around a participant. For example, FIG. 5 illustrates the first virtual object 135A in the virtual environment 111. The first virtual object 135A is located at a first position ($X_A$, $Y_A$). A minimum threshold distance $TD_{MIN}$ from the first virtual object 135A forms a boundary 510. A maximum threshold distance $TD_{MAX}$ from the first virtual object 135A forms a boundary 520.

The minimum threshold distance $TD_{MIN}$ defines a full volume zone 525 within the boundary 510. The maximum threshold distance 520 defines a no-volume zone 530 outside of the boundary 520. A reduced volume zone 535 is defined between the minimum threshold distance $TD_{MIN}$, (boundary 510) and the maximum threshold distance $TD_{MAX}$ (boundary 520). The volume of chat communications between participant $P_1$ (FIG. 1) controlling the first virtual object 135A and participant $P_2$ (FIG. 1) controlling the second virtual object 135B depends on the distance between the objects relative to the zones 525, 530 and 535.

As shown in FIG. 5, The second virtual object 135B is shown at a first position ($X_B$, $Y_B$), a distance $D_{12}$ from the first virtual object 135A. The distance $D_{12}$ is less than the minimum distance threshold $TD_{MIN}$, thus in this first position the second virtual object is in the full volume zone 525. In some embodiments, the chat audio between the first and second participants is regulated at a full volume level when the second virtual object is in the full volume zone 525. For example, with reference to FIG. 2, the P1-P2 chat audio 115AB has a volume out VAB equal to a full volume level. This may enable optimal vocal communication between the first and second participants, possibly even the ability to whisper to one another. A realism results from such a volume control, as characters in close proximity would expected to have optimal ability to communicate vocally.

FIG. 5 also shows the second virtual object 135B in a exemplary second position ($X_B'$, $Y_B'$), wherein the distance $D_{12}$ is further from the first virtual object 135A than the first exemplary position ($X_B$, $Y_B$). In the exemplary second position ($X_B'$, $Y_B'$), the distance $D_{12}$ exceeds the minimum distance threshold $TD_{MIN}$ and is less than the maximum distance threshold $TD_{MAX}$, and therefore the second virtual object 135B is within the reduced volume zone 535. As a result, the chat audio volume between the first and second participants controlling the virtual objects 135A and 135B is reduced from the full volume level. The resulting effect is realistic as characters would not expect communications to remain optimal as the distance between them increases.

FIG. 5 further shows the second virtual object 135B in an exemplary third position ($X_B''$, YB"), wherein the distance $D_{12}$ is even further from the first virtual object 135A. The distance $D_{12}$ exceeds the maximum distance threshold $TD_{MAX}$, and therefore the second virtual object 135B is in the no volume zone 530. In some implementations, the chat audio between the first and second participants is regulated to have no volume when the second virtual object is in the no volume zone 530. For example, with reference to FIG. 2, the P1-P2 chat audio 115AB has a volume out VAB equal to a zero, not enabling vocal communication between the first and second participants. The resulting no-volume effect within the virtual environment is realistic, as characters a long distance from each other would not expect to be able to communicate vocally.

Of course, the operating environment could be designed to have features that could override chat audio volume control. One example is that if virtual object characters acquire virtual communication devices such as radios within the virtual environment, the system could enable chat audio between the participants controlling those radio-equipped virtual characters regardless of the distance separating them.

FIG. 6 is a flow diagram of a routine 600 providing chat audio volume control among participants controlling virtual objects within a virtual environment, particularly an environment as described above in connection with FIG. 5. Routine 600 starts with operations 410, 420, 430, and 440 already described above in connection with routine 400 with reference to FIGS. 4A and 4B. Following operation 440, at operation 460, the system determines a distance between the first virtual object controlled by the first participant and the second virtual object controlled by the second participant, as also described in connection with routine 400 above and FIG. 4.

Next, operation 650 determines if the distance between the first and second virtual objects exceeds a maximum threshold distance. If the distance exceeds the maximum, operation 655 sets the chat volume to zero for chat audio between P1 and P2. For example, with reference to FIG. 2, the volume out VAB is zero for the P1-P1 chat audio 115AB, resulting in zero volume to the audio output 117A to P1 and zero volume to the audio output 117B to P2.

Turning back to FIG. 6, if the distance does not exceed the maximum threshold distance, operation 660 determines if the distance is less than a minimum threshold distance. If the distance is less than the minimum threshold distance, operation 665 sets the volume to a full volume level for chat audio between P1 and P2. For example, with reference to FIG. 2, the volume out VAB is set to a full volume level the P1-P1 chat audio 115AB, resulting in full volume to the audio output 117A to P1 and full volume volume to the audio output 117B to P2.

Again referring to FIG. 6, if the distance is not less than the minimum threshold distance and the distance does not exceed the maximum threshold distance, then operation 670 adjusts the chat audio volume for voice chat communications between the first and second participants as a function of distance. In an embodiment, all adjustments are relative to a full volume level, thus reflecting a reduction relative to full volume.

Operation 670 can be implemented according to a variety of ways. In one embodiment, where the distance D is greater than the minimum threshold distance $TD_{MIN}$ and less than the maximum threshold distance $TD_{MAX}$, the volume level can be set as a function of ratio ($TD_{MAX}$–D)/($TD_{MAX}$–$TD_{MIN}$) relative to the full volume level. For example, where $TD_{MAX}$ is 100 distance units from the first virtual object, the $TD_{MIN}$ is 10 distance units from the first virtual object, and the distance D is 55 distance units from the first virtual object, the volume is (100-55)/(100-10) of full volume, which is to say ½ or 50% of full volume. Other suitable functions could be used, preferably such that the overall volume is smaller as increases, and the volume is higher as the distance decreases.

After operation 670 adjusts volume as a function of distance, the system continues to monitor and determine the distance between the first and second virtual objects at operation 460.

FIG. 7 is a flow diagram of a routine 700 providing chat audio volume control among participants controlling virtual objects within a virtual environment, particularly an environment as described above in connection with FIG. 5. Routine 700 is similar to routine 600 of FIG. 6, with additional operations to further increase chat volume that has been reduced under conditions depending on the input volume. Routine 700 starts with operations 410, 420, 430, 440, and 450 already described above in connection with routine 400 with reference to FIGS. 4A and 4B. Again, at operation 450 the system monitors a volume level of a chat audio signal captured by the input device of the first participant.

In routine 700, following operation 450, operations 640, 650, 655, 660, 665 and 670 occur in the same manner as already described in connection with routine 600 of FIG. 6, except after operation 670 wherein the chat volume between first and second participants has been reduced, operation 780 determines if the input volume of the signal captured by the input device of the first participant (as monitored at operation 450) has exceeded the volume threshold (determined at operation 440). If operation 780 determines the input volume does not exceed the volume threshold, the chat volume between first and second participants remains the reduced volume set at operation 670, and the system continues to operation 450 to monitor the volume level of chat audio signal of the input device of the first participant. If operation 780 determines that the input volume exceeds the volume threshold, then the volume level that had been reduced relative to full volume at operation 670 is increased. The effect can that if the distance between first and second virtual objects is no longer in the full volume zone (FIG. 5), and therefore the chat volume between the participants controlling those virtual objects is less than optimal, and a participant can shout or speak at a higher than normal volume level so as to increase chat volume by some amount. The increase may be a suitable percentage or increment of volume higher than the reduced volume. In an embodiment, despite increasing threshold, the volume is preferably never more than the full volume level.

Although routines 400, 600 and 700 reflect operations from the perspective of a first participant P1 relative to the second participant P2, the routines are preferably applied to each participant relative to all other participants controlling virtual objects in the virtual environment.

In other embodiments, an input to a chat channel can influence activity in a virtual environment session. For instance, a system can manage session data 110 defining a virtual environment 111, the session data 110 defining coordinates of the virtual object 135A. The system can move the position of the virtual object 135A relative to the coordinates based upon input from a participant P1 controlling the virtual object 135A. The system can also cause the generation of session audio data 113 that is coordinated with activity of the virtual object 135A. The system can also manage audio streams that enable vocal communication between the participant P1 and a plurality of participants $P_1$-$P_N$. In some embodiments, the audio streams for vocal communication can be on a channel or hardware devices that is separate from a channel or hardware devices that manages the session audio data. The system can monitor a volume of a chat audio signal 115 generated by an input device 132A associated with the participant $P_1$. The system can also determine that the volume of the chat audio signal (115) generated by the input device (132A) has a change with respect to a threshold. In response to determining that the volume of the chat audio signal 115 generated by the input device 132A has a change with respect to a threshold, the system can modify a property of the virtual object 135A) according to the change in the volume.

For example, the process of modifying the property of the virtual object 135A according to the change in the volume can comprise modifying an appearance of the virtual object 135A to include an avatar performing a yelling gesture when the volume of the chat audio signal is increased over the threshold.

In another example, the process of modifying the property of the virtual object 135A according to the change in the volume comprises modifying an appearance of the virtual object 135A to include an avatar performing a gesture indicating that the avatar is whispering or talking quietly when the volume of the chat audio signal is below the threshold.

In another example, the process of modifying the property of the virtual object according to the change in the volume comprises, enabling a second virtual object to trigger an action in response to determining that the volume of the chat audio signal is increased over the threshold. In this example, if a first player is controlling an avatar, the voice chat input of the first player can trigger another object to take an action if the volume of the first player's voice exceeds a threshold. For example, if a user talks loudly in a chat session, a computer-controlled object, such as a monster or enemy, can react to the user's voice. The reaction of the computer-controlled object can also be based on a distance between the computer-controlled object and the user's avatar. Thus, the computer-controlled object may only react to the user's voice input if the volume of the user's chat voice exceeds a threshold, and if the distance between the object and the user's avatar is less than a threshold distance.

FIG. 8 shows additional details of an example computer architecture for the components shown in FIG. 1 capable of executing the program components described above. The computer architecture shown in FIG. 8 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 8 may be utilized to execute any of the software components described above. Although some of the components described herein are specific to the computing devices 120, it can be appreciated that such components, and other components may be part of any suitable remote computer 801, such as the authentication system 115 or another computing device 120.

The computing device 120 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 120.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 120. The chipset 806 may further provide an interface to a computer-readable storage medium such as a read-only memory ("ROM") 810 or non-volatile RAM ("NvirtualAM") for storing basic routines that help to startup the computing device 120 and to transfer information between the various components and devices. The ROM 810 or NvirtualAM may also store other software components necessary for the operation of the computing device 120 in accordance with the embodiments described herein.

The computing device 120 may operate in a networked environment using logical connections to remote computing devices and computer systems through a network, such as the local area network. The chipset 806 may include functionality for providing network connectivity through a network interface controller (NIC) 812, such as a gigabit Ethernet adapter. The NIC 812 is capable of connecting the computing device 120 to other computing devices over the network. It should be appreciated that multiple NICs 812 may be present in the computing device 120, connecting the computer to other types of networks and remote computer systems. The network allows the computing device 120 to communicate with remote services and servers, such as the remote computer 801. As can be appreciated, the remote computer 801 may host a number of services such as the XBOX LIVE gaming service provided by MICROSOFT CORPORATION of Redmond Wash. In addition, as described above, the remote computer 801 may mirror and reflect data stored on the computing device 120 and host services that may provide data or processing for the techniques described herein.

The computing device 120 may be connected to a mass storage device 826 that provides non-volatile storage for the computing device. The mass storage device 826 may store system programs, application programs, other program modules, and data, which have been described in greater detail herein. The mass storage device 826 may be connected to the computing device 120 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 120 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 120 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 120 may further read information from the mass storage device 826 by detecting the physical states or characteristics of one or more particular locations within the physical storage units.

In addition to the mass storage device 826 described above, the computing device 120 may have access to other computer-readable media to store and retrieve information, such as program modules, data structures, or other data. Thus, although the companion application 132, the game application 131, other data and other modules are depicted as data and software stored in the mass storage device 826, it should be appreciated that these components and/or other modules may be stored, at least in part, in other computer-readable storage media of the computing device 120. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 120.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 120. For purposes of the claims, the phrase "computer storage medium," "computer-readable storage medium," and variations thereof, does not include waves or signals per se and/or communication media.

The mass storage device 826 may store an operating system 827 utilized to control the operation of the computing device 120. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 120, such as the game application 131, companion application 132, game data 204, control commands 205, and/or any of the other software components and data described above. The mass storage device 826 might also store other programs and data not specifically identified herein.

In one embodiment, the mass storage device 826 or other computer-readable storage media is encoded with computer-executable instructions which, when loaded into the computing device 120, transform the computer from a general-purpose computing system into a special-purpose computer capable of implementing the embodiments described herein. These computer-executable instructions transform the computing device 120 by specifying how the CPUs 804 transition between states, as described above. According to one embodiment, the computing device 120 has access to computer-readable storage media storing computer-executable instructions which, when executed by the computing device 120, perform the various routines described above with regard to FIG. 7 and the other figures. The computing device 120 might also include computer-readable storage media for performing any of the other computer-implemented operations described herein.

The computing device 120 may also include one or more input/output controllers 816 for receiving and processing input from a number of input devices, such as a keyboard, a mouse, a microphone, a headset, a touchpad, a touch screen, an electronic stylus, or any other type of input device. Also shown, the input/output controllers 816 is in communication with an input/output device 825. The input/output controller 816 may provide output to a display device, such as a computer monitor, a flat-panel display, a digital projector, a printer, a plotter, or other type of output device. The input/output controller 816 may provide input communication with other devices such as a microphone 119', a speaker 119", game controllers and/or audio devices. In addition, or alternatively, a video output 822 may be in communication with the chipset 806 and operate independent of the input/output controllers 816. It will be appreciated that the computing device 120 may not include all of the components shown in FIG. 8, may include other components that are not explicitly shown in FIG. 8, or may utilize an architecture completely different than that shown in FIG. 8.

As support for the embodiments described above and others, the following description is also provided. The present invention relates generally to a system for collecting, analyzing, filtering, and adapting voice information for reaction of the system to said voice information typically during game play. The system utilizes a proprietary software that enables voice recognition and changes to voice characteristics and may precipitate reaction by the game to changes in voice characteristics based on specific voice criterion, including pitch, volume, articulation, background noise and the like, and may alter game play based on this information. The system further will analyze information from individual players and may allow the game to react to analyzed information received from a particular user whereby the system would recognize changes in voice volume, pitch and the like to increase and enhance game interaction by the individual game player whereby the game may react to any of these voice criterion which may create a more realistic game environment.

To this end, in an exemplary embodiment of the present invention, a system for voice adaption, the system comprising: a computer implemented software adapted to monitor, filter and analyze voice criterion whereby the software allows for use by a plurality of end users, each utilizing the computer implemented software.

In an exemplary embodiment of the present invention, a system for voice reaction, the system comprising: a computer implemented software adapted to monitor, filter and analyze voice criterion; a plurality of end users, each utilizing a processing unit; and each of said plurality of end users utilizing the computer implemented software.

In an exemplary embodiment, wherein the system has a voice recognition system whereby the system is able to recognize, monitor and store voice information from each of the plurality of end users.

In an exemplary embodiment, wherein the system monitors specific voice criterion and adapts associated software to react to the specific voice criterion accordingly.

In an exemplary embodiment, wherein the system is utilized for multi-player gaming.

In an exemplary embodiment, wherein the system is utilized for online multi-player gaming applications.

In an exemplary embodiment, wherein the system alters game play based on voice criterion inputted into the system to create more realistic game play.

In an exemplary embodiment, wherein the system monitors, analyzes and filters voice criterion including voice pitch, volume, articulation, background noise and alters game play in response to any of the voice criterion.

In an exemplary embodiment, wherein the system randomly reacts to voice information inputted into the system and adapts to the voice criterion.

In an exemplary embodiment, wherein the system at least a game reaction control module associated with an input mechanism.

In an exemplary embodiment, wherein the system at least a voice recognition module whereby the module allows for a baseline test of the individual user's voice characteristics.

In an exemplary embodiment, wherein the system monitors and analyzes voice characteristics including voice pitch, volume, articulation, background noise and stores the voice characteristics in a processing unit.

In an exemplary embodiment, wherein the system receiving device for receiving audio signals from a individual user, the receiving device including microphones, speakerphones, throat mics and the like.

In an exemplary embodiment, wherein the system a game controlling module to allow for alteration and reaction of game play by the system.

In an exemplary embodiment, wherein the system a game command unit which interacts with the game algorithm to alter reaction of game characters in response to input voice characteristics.

In an exemplary embodiment, wherein the system a voice recognition module which allows for input and analysis of voice characteristics.

In another exemplary embodiment, wherein said system has a voice recognition system whereby the system is able to recognize, monitor and store voice information from each of the plurality of end users.

In another exemplary embodiment, wherein the system monitors specific voice criterion and adapts associated software accordingly to react to the specific voice criterion.

In another exemplary embodiment, wherein the system is utilized for multi-player gaming.

In another exemplary embodiment, wherein the system is utilized for online multi-player gaming applications.

In another exemplary embodiment, wherein the system reacts to gaming play based on voice criterion inputted into the system to create more realistic game play.

In another exemplary embodiment, wherein the system monitors, analyzes and filters voice criterion including voice pitch, volume, articulation, background noise and alters game play in response to any of the voice criterion.

In another exemplary embodiment, wherein the system randomly reacts to voice information inputted into the system and reacts to the voice criterion.

In an exemplary embodiment of the present invention, an improved voice reactive system is provided.

In yet another exemplary embodiment of the present invention, an improved voice reactive system is provided whereby the system may be utilized for online gaming play.

Still another exemplary embodiment of the present invention is to provide an improved voice reactive system which allows the program affiliated with the voice adaptive system to react to criteria associated with the system.

In an exemplary embodiment of the present invention, an improved voice reactive system is provided whereby the system may provide more realistic game play during online gaming.

In yet another exemplary embodiment of the present invention, an improved voice reactive system is provided whereby the voice adaptive system may monitor voice criterion such as voice pitch.

In yet another exemplary embodiment of the present invention, an improved voice reactive system is provided whereby the voice adaption system may monitor voice criterion such as voice volume.

Still another exemplary embodiment is to provide an improved voice reactive system whereby the system may monitor audible criteria such as volume, pitch, length, duration of voice elements and the like.

Yet another exemplary embodiment of the present invention is to provide an improved voice reactive system whereby the system may be integrated into gaming content to improve game play.

In yet another exemplary embodiment of the present invention, an improved voice reactive system may be provided whereby the system may be applied to a plurality of computing devices.

In still another exemplary embodiment of the present invention, an improved voice reactive system may be provided whereby the system may be applied to a plurality of computing devices including personal computers, laptops, smal tphones, PDAs, digital organizers, and other consumer electronics including TIVO®, gaming systems and the like.

Yet another exemplary embodiment of the present invention is to provide an improved voice reactive system whereby the system may alter programming to react to specific voice changes in response to predetermined voice criterion.

Still another exemplary embodiment of the present invention is to provide an improved voice reactive system whereby the system may monitor, filter and adapt to voice criterion input by the individual end user.

Another exemplary embodiment of the present invention is to provide an improved voice reactive system whereby the system may be implemented into gaming content and more specifically, gaming content having a plurality of players whereby the plurality of players are capable of communicating with one another.

In yet another exemplary embodiment of the present invention is to provide an improved voice reactive system, whereby the system may be integrated into online game play including multiple player applications whereby the multi-player application allows for communication between the plurality of game players and whereby the system may be integrated into the online game play to adapt to voice criterion displayed by each individual player in the multi-player application.

Still another exemplary embodiment of the present invention is to provide an improved voice reactive system whereby the system may be integrated into online games having a plurality of players whereby the game may adapt to certain voice criterion identified by the system and whereby the system may alter game play based on these voice criterion.

Another exemplary embodiment of the present invention is to provide an improved voice reactive system whereby the system may be configured to allow for continual adaption of multi-player gaming based on voice criteria and characteristics displayed by any of the individual users of a multi-game system.

Yet another exemplary embodiment of the present invention is to provide an improved voice reactive system whereby the system may monitor and collect data relating to individual user voice characteristics and may alter user content and use when the system detects changes in individual user voice characteristics.

In yet another exemplary embodiment of the present invention is to provide an improved voice reactive system whereby the system may produce real time changes in gaming experience based on voice detection changes.

Still another exemplary embodiment of the present invention is to provide an improved voice reactive system whereby the system parameters may be established by each individual end user such as frequency, urgency and adaptive response to such criterion while utilizing the system.

In yet another exemplary embodiment, an improved voice reactive system may be provided whereby the system may filter voice criterion and randomly select which criterion to utilize, thus producing random reaction by the program such as random reaction by an online game in response to only certain voice criterion while ignoring other voice criterion.

Still another exemplary embodiment of the present invention is to provide an improved voice reactive system whereby the system is capable of voice filtering, voice data collection and background noise filters.

Yet another exemplary embodiment of the present invention is to provide an improved voice reactive system whereby the system may be activated or de-activated by the individual user to enhance the experience by each individual user.

Still another exemplary embodiment of the present invention is to provide an improved voice adaptive system whereby the system may enhance online game play during use of same.

In some configurations, a voice reaction and adaption game controlling apparatus and system in accordance with one embodiment of the present invention is provided. The voice reaction/adaption system may have a plurality of function portions that may include at least a voice recognition portion or module and a game reaction control portion or module which are both contained within a centralized processing unit. The voice recognition module may be an algorithm, or in an alternative, may be a piece of circuitry within associated hardware whereby the voice recognition module may process inputted audio signals from a desired user, convert the audio signals and transmit the voice signals received from a microphone or other audio device. In the present embodiment, a voice recognition module may be connected with receiving devices including microphones and the like to receive audio signals from the individual game user. The receiving device may be any number of devices that are capable of receiving and transmitting audio data to the system. In an exemplary embodiment, the receiving device may include conventional, prior art devices such as microphones, speakerphones, throat mics and the like. The acoustic signals uttered by users, for example, a word, a term, or even a sentence, may be received and inputted to the voice recognition module through the receiving devices. The device may further have at least a processing portion in voice recognition module which is further coupled with the acquisition devices. For example, a microphone may be utilized to capture voice information from an individual user. The microphone will relay the audio data to the voice recognition module having a processor portion therein. The processor portion will monitor audio data receiving including pitch, volume, frequency and other information received to determine if and what information needs to be relayed to the game system associated with the voice reaction system. The game system associated with the voice reaction system may upon receipt of audio characteristic information, change game play depending on the audio information received.

The processing portion of the voice reaction system may have audio circuitry which may convert analog audio signals to digital signals prior to introducing the audio information to the processor portion. It is further contemplated that prior to commencement of game play, a base line reading of an individual user's normal audio frequencies and other voice characteristics may be tested to determine the changes in frequency, pitch, volume, diction and speed which may be utilized to alter game play for the individual user once these voice characteristic baseline analysis is completed and the module has stored the same. This step may take place prior to beginning game play, which may allow the user to determine if they wish to have the game play altered, modified or increase game sensitivity to the user's changing voice characteristics.

In an exemplary embodiment, it is contemplated that the processing portion of the voice recognition module may be associated with a command registration unit which may be associated with at least the game console apparatus. The command unit communicates with a game control module located in the game console and relays voice characteristic information from the recognition module to the game console apparatus to allow for information relay and adaption of the game algorithms in response to the voice characteristic data received from the processing portion of the voice recognition module. It is contemplated that the command unit may allow for audio information received from the voice recognition module to be received, sent to the game controlling module in the game console or computer to be used to alter, change or adapt game play depending on the audio signals and audio digital data received from the recognition module. This may allow game play to change with the individual user's voice information. The net effect of allowing alteration of game play is to make the entire gaming experience more realistic for the user.

In an exemplary embodiment, it is contemplated that the command unit may have the ability to store voice signals which are received from the processing portion of the voice recognition module. In an exemplary embodiment, the registration unit may be a common memory unit, such as DRAM or flash. In the embodiment of the present invention, users can choose the operation mode of game controlling apparatus to determine if the individual gaming user wishes to have game adaption based on voice signal information received by the game console or computer system which contains the game algorithms. Prior to commencement of game play, an associated algorithm in the processing unit of the game console or computer may prompt the individual user to determine if that user wishes to utilize reaction and adaption systems based on audio information received from the voice recognition module. If the individual user so desires, they may activate the reaction/adaption portion for enhanced game play. Further to this, the individual game user may wish to de-activate the enhanced adaption/reaction unit. The game controlling unit may allow for the system to be de-activated at any time by the individual user when desired.

Prior to entering game play, a sample voice/audio signal may be provided to the command unit which may serve as a baseline for the audio signal information input later into the unit. The baseline will allow the registration unit to monitor for changes in audio data received from the voice recognition module and alter game play based on these changes. The command registration may also utilize this baseline audio information for the purposes of identification of each individual game user. The baseline information may be stored in the registration unit for later use by the same player, such that the game player does not need to go through the identification, authentication and sample process each time they access the game. Moreover, the baseline audio signals may be stored in the processing unit of the voice recognition module such that once stored, the individual user may just load the game to play and the system will know what the normal voice characteristics are for that particular user and may begin game adaption and reaction based on previously loaded and stored audio data.

For this operation, the voice processing module may have associated therewith a comparative unit which is may make a determination between voice characteristic data received from the acquisition device to identify and determine if changes in voice information is detected.

This comparative unit may be a type of signal comparator which may be utilized to both identify voice characteristics of an individual user and compare the baseline data with later inputted voice character tics like volume, diction, speed and the like. When the game controlling apparatus is in adaption/reaction mode, the voice signals digitalized by the processing unit are transmitted to the comparative unit to determine if changes in voice characteristics are found and if they are found, then the digital audio information is forwarded to the command registration unit which is associated with the game console and/or computer. Then, if characteristics in the audio data are found, such as changed volume, speed of speech or other voice characteristics are noted by the command registration unit, the command unit may check against a predetermined adaption/reaction to those changed characteristics. For example, if the volume of the audio information is determined to be much greater than the baseline volume during the baseline authentication process, the command unit may alter game play to allow the game to react to the voice characteristics. For example, if the command unit observes increased volume, the command unit may alter game play such that a character in the game itself reacts to the increased volume as if the character realizes that the individual user has yelled. Typically, game play utilizes an avatar, which is the game player representation of themselves in the game. The avatar will be presumed to be yelling, whereby other characters in the game which are controlled by the command unit or other users may change play characteristics in response to the yelling of the avatar controlled by the individual game player. By allowing the other computer-controlled characters in the game to react and adapt to voice characteristics on an individual game player, the gaming experience is greatly enhanced by providing much greater authenticity to the entire gaming experience.

It is contemplated that the game control system may have at least an input portion and an output portion, and an encoding unit which may be coupled with the input portion and output portion. Additionally, the system may also have a software algorithm with an encoder that is configured to work in association with the command unit. The software algorithm may utilize a pre-associated code which gives information to the command unit to alter game play or react to voice commands and characteristics.

In an exemplary embodiment, a plurality of input devices may be utilized with the input portion of the voice recognition system to effect adaption and reaction of the game play to the individual user's voice characteristics thereby effecting the game controlling apparatus. It is contemplated that the input devices may include a plurality of different input devices such as a controllers, keyboards, mouse, game joysticks and other game controlling devices, which may be operated by the individual game player to perform gaming performance during game play. In operation, the aforementioned input devices may produce a series of input signals, i.e. game commands, to be transmitted to the game controlling apparatus through cable. The game command received by input portion may be further transferred to an encoding unit coupled with input portion. It is contemplated that the encoding unit may encode the input signal into a computer-executable signal which may be processed by the components in the game controlling module. The encoding unit may be provided with the capability to manipulate all kinds of game command signals inputted because every game platform or game console has its own input/output signal format. And also, the encoding unit must have the capability to output all kinds of signal formats used by various game platforms to perform the desired action in the game. Game commands inputted by the individual game user may be encoded into a serial of scan codes to be received by a software driver unit and then be transmitted to a command registration unit which is coupled with a software driver unit. When the game is in reaction/adaption mode, the input signals are analyzed along with the audio signals that the acquiring device receives and both the input signals from game command devices, such as game controllers and the audio signals are analyze and utilized by the game console and/or computer to provide adequate feedback to the individual user in the form of game adaption to those different control mechanisms.

In the embodiment of the present invention, the system is set up to collect, analyze, filter, adapt, and react to voice information during game play. When the system is set up for reaction configuration, the user may request that the game responds and reacts during game play to the voice information received by the system. Each piece of voice characteristics may be evaluated and stored in the processor by the system. Characteristics include pitch, volume, articulation, speed and the like. Any combination of voice characteristics may be utilized and stored in the system to be utilized for altering or adapting game play to the voice characteristics. When a user utters a valid, registered voice signal into the input device, the software driver unit in game controlling module will retrieve the corresponding voice characteristic and forward those characteristics to the command registration unit and transmit it to the encoding unit which may alter game play based on the audio characteristic. A plurality of game platforms (ex. game console or PC) are connected with output terminal on game controlling apparatus and receive said activated game command to perform the desired gaming action.

In another exemplary embodiment, the game console or computer may allow for conversion of an audio signal to a digital signal, whereby the voice recognition and adaption system may coordinate with the processing unit in the system to determine if changes in voice characteristics are noted. The system may do this by having the voice recognition and adaption system/module coupled to the processing unit. It is contemplated that the voice recognition module is utilized to recognize the voice characteristics of an individual user. The audio signals received and processed by the voice recognition module can be any time of audio signal including speech, or other audio data. The voice recognition and adaption engine may coordinate with the processing unit to determine if changes in voice characteristics are noted. The characteristic data extracted by voice recognition engine may be transmitted directly to encoding unit without passing determination unit and command registration unit. Subsequently, the data is encoded and outputted to the desired game console and/or computer having associated adaption software or algorithms that may allow for adaption of game play based on the voice characteristics received. Thereby, the voice characteristics displayed by the individual game user may be utilized by the gaming console or computer system to adapt game play and react to the characteristics depending on the conversion and control of the software algorithm associated with the system. Thereby the user may enhance game play by allowing adaption and reaction by the game to the user's voice characteristics to provide higher to the game during play.

The voice recognition and adaption system may originate from a number of external voice acquisition devices. These devices may include speakers, microphones, Bluetooth devices, headsets and the like to receive audio signals from the individual user. Additionally, in combination with the external voice acquisition devices, a number of game control devices may be utilized including game controllers, control pads, keyboards, mouse and the may be utilized and in combination the information received from the acquisition devices and the game control devices may be forwarded to the game command unit within the game console to allow for adaption and reaction of the game algorithm in response to these acquisition devices. It is contemplated that the game adaption/reaction system may be configured to be adapted to a plurality of different game platforms currently available for game play including PCs, PlayStation, Wii, Xbox and other known game console units. It is further contemplated that the voice adaption system may allow the individual user to either activate or de-active the system while the user is currently "in-game."

The disclosure presented herein may be considered in view of the following examples.

Example A: A system, comprising: a processor; a session module for managing session data defining a three-dimensional virtual environment, wherein the session data defines coordinates of a plurality of virtual objects, the session module also causing the generation of session audio data in response to activity of the virtual objects; a chat module for managing audio streams that enable vocal communication between a plurality of participants controlling the virtual objects; a memory in communication with the processor, the memory having computer-readable instructions stored thereupon that, when executed by the processor, cause the processor to: monitor a volume of a chat audio signal generated by an input device associated with a first participant of the plurality of participants; determine if the volume of the chat audio signal generated by the input device associated with the first participant is below a threshold volume; determine a distance between a first virtual object controlled by the first participant and a second virtual object controlled by a second participant of the plurality of participants; and reduce a volume of the chat audio signal between the first participant and the second participant in response to determining that the chat audio signal generated by the input device associated with the first participant is below a threshold volume and determining that the distance between the first virtual object and the second virtual object exceed a threshold distance.

Example B: The system of Example A, wherein when instructions further cause the processor to: deliver the chat audio signal between the first participant and second participant at a full volume level when the distance is less than the threshold distance.

Example C: The system of Examples A and B, wherein the instructions further cause the processor to: establish a baseline volume based on a sample of the chat audio signal from the input device associated with the first user; set the threshold volume at a value higher than the baseline volume.

Example D: The system of Examples B through C, wherein the baseline is established before the first virtual object begins interaction with the virtual environment.

Example E: The system of Examples B through D, wherein to reduce the volume results in a decrease of the volume by a predetermined amount.

Example F: The system of Examples B through E, wherein to reduce the volume results in zero volume.

Example G: A computer-implemented method of controlling a volume of chat audio between participants controlling objects to move in a virtual environment, the method comprising: managing session data defining a three-dimensional virtual environment, the session data defining coordinates of a plurality of virtual objects, moving positions of the virtual objects relative to the coordinates based upon input from a plurality of participants controlling the virtual objects and causing the generation of session audio data in response to activity of the virtual objects; managing audio streams that enable vocal communication between the plurality of participants; monitoring a volume of a chat audio signal generated by an input device associated with a first participant of the plurality of participants; determining if the volume of the chat audio signal generated by the input device associated with the first participant is below a threshold volume; determining a distance between a first virtual object controlled by the first participant and a second virtual object controlled by a second participant of the plurality of participants; and reducing a volume of the chat audio signal between the first participant and the second participant in response to determining that the chat audio signal generated by the input device associated with the first participant is below a threshold volume and determining that the distance between the first virtual object and the second virtual object exceed a threshold distance.

Example H: The computer-implemented method of Example G, further comprising: delivering the chat audio signal between the first participant and second participant at a full volume level when the distance is less than the threshold distance.

Example I: The computer-implemented method of Examples G through H, further comprising: establishing a baseline volume based on a sample of the chat audio signal from the input device associated with the first user; setting the threshold volume at a value higher than the baseline volume.

Example J: The computer-implemented method of Examples G through H, wherein the baseline is established before the first virtual object begins interaction with the virtual environment.

Example K: The computer-implemented method of Examples G through J, wherein to reduce the volume results in a decrease of the volume by a predetermined amount.

Example L: The computer-implemented method of Examples G through K, wherein to reduce the volume results in zero volume.

Example M: A computer-implemented method of controlling a volume of chat audio between participants controlling objects to move in a virtual environment, the method comprising: receiving session data defining a virtual environment and a plurality of virtual objects; managing chat audio streams that enable vocal communication among a plurality of participants controlling the virtual objects, the audio streams including an audio input signal and audio output signal assigned to each of the respective participants participating in vocal communications; determining a distance between a first virtual object controlled by a first participant and a second virtual object controlled by a second participant of the plurality of participants; reducing a volume level of a chat audio signal between the first participant and the second participant relative to a full volume level as a function of the distance such that the volume level decreases as the distance increases.

Example N: The computer-implemented method of Example M, whereby that the volume level is zero if the distance exceeds the maximum threshold distance $TD_{MAX}$.

Example O: The computer-implemented method of Examples M-N, wherein the distance D is less than the maximum threshold distance $TD_{MAX}$ the volume level is a function of $(TD_{MAX}-D)/TD_{MAX}$ relative to the full volume level.

Example P: The computer-implemented method of Examples M through O, wherein the volume level is the full volume level if the distance is less than a minimum distance threshold $TD_{MIN}$.

Example Q: The computer-implemented method of Examples M through P, wherein if the distance D is greater than the minimum threshold distance $TD_{MIN}$ and less than the maximum threshold distance $TD_{MAX}$, the volume level is a function of ratio $(TD_{MAX}-D)/(TD_{MAX}-TD_{MIN})$ relative to the full volume level.

Example R: The computer-implemented method of Examples M through Q, wherein the chat audio signal includes an input chat audio signal generated by an input device capturing voice input by the first participant, and wherein controlling the volume level includes regulating the volume level of the input chat audio signal.

Example S: The computer-implemented method of Examples M through R, wherein the chat audio signal includes an chat audio output signal delivered to the first participant and a chat audio output signal delivered to the second participant wherein controlling the volume includes regulating an output volume of the chat audio output signals delivered to the first and second participants.

Example T: The computer-implemented method of Examples M through S, further comprising: monitoring a volume level an input chat audio signal generated by an input device associated with the first participant; wherein the volume level is increased relative to the full volume level in response to determining that the chat audio signal generated by the input device associated with the first participant is above a threshold volume.

Example U: A computer-implemented method for controlling a computer-controlled virtual object of a virtual environment, the method comprising: receiving session data defining the virtual environment, the session data defining a position of the computer-controlled virtual object and a position of a user-controlled virtual object that is based upon an input from a participant (P1) controlling the user-controlled virtual object, the session data causing a generation of session audio data that is coordinated with activity of the computer-controlled virtual object; receiving a chat audio signal that provides vocal communication between the participant (P1) and a plurality of participants ($P_2$-$P_N$); determining that a volume (VP1) of the chat audio signal generated from a vocal input of the participant ($P_1$) at an input device has a change with respect to a volume threshold; determining, at a computing device, that the position of the computer-controlled virtual object is within a threshold distance of the position of the user-controlled virtual object; and in response to determining that the volume of the chat audio signal that provides vocal communication between the participant (P1) and the plurality of participants ($P_2$-$P_N$) exceeds the volume threshold and determining that the position of the computer-controlled virtual object is within the threshold distance of the position of the user-controlled virtual object, executing an action to be performed by the computer-controlled virtual object.

Example V: The computer-implemented method of Example U, wherein the action comprises, causing the computer-controlled virtual object to express a gesture indicating that the computer-controlled virtual object has detected a presence of the user-controlled virtual object.

Example W: The computer-implemented method of Examples V and U, wherein the computing device reduces a probability of the performance of the gesture when the volume of the chat audio signal does not exceed the volume threshold.

Example X: The computer-implemented method of Examples V through W, wherein the computing device reduces a probability of the performance of the gesture when the position of the computer-controlled virtual object is not within the threshold distance of the position of the user-controlled virtual object.

Example Y: The computer-implemented method of Examples V through X, wherein the action comprises, causing the computer-controlled virtual object to perform a gesture that is indicated by the vocal input of the participant.

Example Z: The computer-implemented method of Examples V through Y, wherein the computing device reduces a probability of the performance of the gesture when the volume of the chat audio signal does not exceed the volume threshold.

Example AA: The computer-implemented method of Examples V through Z, wherein the computing device reduces a probability of the performance of the gesture when the position of the computer-controlled virtual object is not within the threshold distance of the position of the user-controlled virtual object.

Example AB: A computer-implemented method for controlling an expression of a virtual object of a virtual environment, the method comprising: receiving session data defining the virtual environment, the session data defining a position of the virtual object that is controlled by an input from a participant (P1) by an input controller, the session data causing a generation of session audio data that is coordinated with movement of the virtual object; receiving a chat audio signal that provides vocal communication between the participant (P1) and a plurality of participants ($P_2$-$P_N$); determining that a volume (VP1) of the chat audio signal generated from a vocal input of the participant ($P_1$) at an input device has a change with respect to a volume threshold; and in response to determining that the volume of the chat audio signal that provides vocal communication between the participant (P1) and the plurality of participants ($P_2$-$P_N$) has changed with respect to the volume threshold, modifying the expression of virtual object.

Example AC: The computer-implemented method of Example AB, wherein modifying the expression of the virtual object comprises, modifying a rendering of the virtual object to include an expression indicating that the virtual object is talking at a reduced volume when the volume of the chat audio signal is below the volume threshold.

Example AD: The computer-implemented method of Examples AB and AC, wherein modifying the expression of the virtual object comprises, modifying a rendering of the virtual object to include an expression indicating that the virtual object is talking at an increased volume when the volume of the chat audio signal is above the volume threshold.

Example AE: The computer-implemented method of AB through AD, further comprising, transitioning the rendering of the virtual object to a second rendering of the virtual object to include a second expression indicating that the virtual object is talking at a reduced volume when the volume of the chat audio signal transitions below a second volume threshold.

Example AF: A system, comprising: a processor; a memory in communication with the processor, the memory comprising a session module for managing session data defining a virtual environment, wherein the session data defines coordinates of a plurality of virtual objects, the session module also causing the generation of session audio data that is coordinated with activity of the virtual objects, the memory further comprising a chat module for managing a chat audio signal that enables vocal communication between a plurality of participants (P1-PN) controlling the virtual objects, the memory having computer-readable instructions stored thereupon that, when executed by the processor, cause the processor to: monitor a volume of the chat audio signal generated by an input device associated with a first participant (P1) of the plurality of participants (P1-PN); determine that the volume of the chat audio signal generated by the input device associated with the first participant (P1) is below a threshold volume; determine a distance (D12) between a first virtual object controlled by the first participant (P1) and a second virtual object controlled by a second participant (P2) of the plurality of participants (P1-PN); and reduce a volume (VAB) of the chat audio signal between the first participant (P1) and the second participant (P2) in response to determining that the chat audio signal generated by the input device associated with the first participant (P1) is below the threshold volume and determining that the distance (D12) between the first virtual object and the second virtual object exceed a threshold distance (D13).

Example AG: The system of Example AF, wherein when instructions further cause the processor to: communicate the chat audio signal between the first participant (P1) and second participant (P2) at a predetermined volume level when the distance is less than the threshold distance.

Example AH: The system of Examples AE through AF, wherein the instructions further cause the processor to: establish a baseline volume based on a sample of the chat audio signal from the input device associated with the first user (P1), wherein the baseline volume is established by receiving a voice input prior to the generation of session audio data; set the threshold volume at a level that is higher than the baseline volume.

Example AI: The system of Examples AE through AH, wherein the baseline is established before the first virtual object begins interaction with the virtual environment.

Example AJ: The system of Examples AE through AI, wherein to reduce the volume results in a decrease of the volume by a predetermined amount.

Example AK: The system of Examples AE through AJ, wherein reducing the volume comprises terminating the chat audio signal between the first participant (P1) and the second participant (P2).

Example AL: A computer-implemented method, comprising: monitoring a volume of a chat audio signal generated by an input device associated with a first participant (P1), wherein the chat audio signal is communicated to a second participant (P2) by a first circuit that is separate than a second circuit for communicating session audio data coordinated with activity of a first virtual object and a second virtual object; determining that the volume of the chat audio signal generated by the input device associated with the first participant (P1) is below a threshold volume; determining that a distance (D12) between the first virtual object controlled by the first participant (P1) and a second virtual object controlled by a second participant (P2) exceeds a threshold distance; and reducing a volume of the chat audio signal communicated between the first participant (P1) and the second participant (P2) in response to determining that the chat audio signal generated by the input device associated with the first participant (P1) is below the threshold volume and determining that the distance (D12) between the first virtual object and the second virtual object exceed a threshold distance (D13).

Example AM: The computer-implemented method of Example AL, further comprising: delivering the chat audio signal between the first participant and second participant at a predetermined volume level when the distance is less than the threshold distance.

Example AN: The computer-implemented method of Examples AL through AM, further comprising: determining that a distance between the first virtual object controlled by the first participant (P1) and a third virtual object controlled by a third participant is within a threshold distance; and communicating a chat audio signal communicated between the first participant and the third participant in response to determining that the chat audio signal generated by the input device associated with the first participant (P1) is below the threshold volume and determining that the distance between the first virtual object and the third virtual object is within the threshold distance.

Example AO: The computer-implemented method of Examples AL through AN, wherein the baseline is established before the first virtual object begins interaction with the virtual environment.

Example AP: The computer-implemented method of Examples AL through AO, wherein to reduce the volume results in a decrease of the volume by a predetermined amount.

Example AQ: The computer-implemented method of Examples AL through AP, wherein to reduce the volume results in zero volume.

Example AR: A computer-implemented method of controlling a volume of chat audio between participants controlling objects to move in a virtual environment, the method comprising: receiving session data defining a virtual environment and a plurality of virtual objects; receiving a chat audio signal that enable vocal communication among a plurality of participants (P1-PN) controlling the virtual objects, the chat audio signal including an audio input signal and audio output signal assigned to each of the respective participants participating in vocal communications; determining a distance (D12) between a first virtual object controlled by a first participant (P1) and a second virtual object controlled by a second participant (P2) of the plurality of participants (P1-PN); reducing a volume level of a chat audio signal between the first participant (P1) and the second participant (P2) relative to a full volume level as a function of the distance (D12) such that the volume level decreases as the distance increases.

Example AS: The computer-implemented method of Example AR, wherein the volume level is zero if the distance exceeds the maximum threshold distance TDMAX.

Example AT: The computer-implemented method of Examples AR through AS, wherein the distance D is less than the maximum threshold distance TDMAX, wherein the volume level is a function of (TDMAX−D)/TDMAX relative to the full volume level.

Example AU: The computer-implemented method of Examples AR through AT, wherein the volume level is the full volume level if the distance is less than a minimum distance threshold (TDMIN).

Example AU: The computer-implemented method of Examples AR through AT, wherein if the distance D is greater than the minimum threshold distance TDMIN and less than the maximum threshold distance TDMAX, the volume level is adjusted a function of ratio (TDMAX−D)/(TDMAX−TDMIN) relative to the full volume level.

Example AV: The computer-implemented method of Examples AR through AU, wherein the chat audio signal includes an input chat audio signal generated by an input device capturing voice input by the first participant P1, and wherein controlling the volume level includes regulating the volume level of the input chat audio signal.

Example AW: The computer-implemented method of Examples AR through AV, wherein the chat audio signal includes an chat audio output signal delivered to the first participant (P1) and a chat audio output signal delivered to the second participant (P2) wherein controlling the volume includes regulating an output volume of the chat audio output signals delivered to the first and second participants.

Example AX: The computer-implemented method of Examples AR through AW, monitoring a volume level an input chat audio signal generated by an input device associated with the first participant (P1); wherein the volume level is increased relative to the full volume level in response to determining that the chat audio signal generated by the input device associated with the first participant (P1) is above a threshold volume.

Example AY: A computer-implemented method for controlling a computer-controlled virtual object of a virtual environment, the method comprising: receiving session data defining the virtual environment, the session data defining a position of the computer-controlled virtual object and a position of a user-controlled virtual object that is based upon an input from a participant (P1) controlling the user-controlled virtual object, the session data causing a generation of session audio data that is coordinated with activity of the computer-controlled virtual object; receiving a chat audio signal that provides vocal communication between the participant (P1) and a plurality of participants (P2-PN); determining that a volume (VP1) of the chat audio signal generated from a vocal input of the participant (P1) at an input device has a change with respect to a volume threshold; determining, at a computing device, that the position of the computer-controlled virtual object is within a threshold distance of the position of the user-controlled virtual object; and in response to determining that the volume of the chat audio signal that provides vocal communication between the participant (P1) and the plurality of participants (P2-PN) exceeds the volume threshold and determining that the position of the computer-controlled virtual object is within the threshold distance of the position of the user-controlled virtual object, executing an action to be performed by the computer-controlled virtual object.

Example AZ: The computer-implemented method of Example AY, wherein the action comprises, causing the computer-controlled virtual object to express a gesture indicating that the computer-controlled virtual object has detected a presence of the user-controlled virtual object.

Example BA: The computer-implemented method of Examples AY through AZ, wherein the computing device reduces a probability of the performance of the gesture when the volume of the chat audio signal does not exceed the volume threshold.

Example BB: The computer-implemented method of Examples AY through BA, wherein the computing device reduces a probability of the performance of the gesture when the position of the computer-controlled virtual object is not within the threshold distance of the position of the user-controlled virtual object.

Example BC: The computer-implemented method of Examples AY through BB, wherein the action comprises, causing the computer-controlled virtual object to perform a gesture that is indicated by the vocal input of the participant.

Example BD: The computer-implemented method of Examples AY through BC, wherein the computing device reduces a probability of the performance of the gesture when the volume of the chat audio signal does not exceed the volume threshold.

Example BE: The computer-implemented method of Examples AY through BD, wherein the computing device reduces a probability of the performance of the gesture when the position of the computer-controlled virtual object is not within the threshold distance of the position of the user-controlled virtual object.

Example BF: A computer-implemented method for controlling an expression of a virtual object of a virtual environment, the method comprising: receiving session data defining the virtual environment, the session data defining a position of the virtual object that is controlled by an input from a participant (P1) by an input controller, the session data causing a generation of session audio data that is coordinated with movement of the virtual object; receiving a chat audio signal that provides vocal communication between the participant (P1) and a plurality of participants (P2-PN); determining that a volume (VP1) of the chat audio signal generated from a vocal input of the participant (P1) at an input device has a change with respect to a volume threshold; and in response to determining that the volume of the chat audio signal that provides vocal communication between the participant (P1) and the plurality of participants (P2-PN) has changed with respect to the volume threshold, modifying the expression of virtual object.

Example BG: The computer-implemented method of Example BF, wherein modifying the expression of the virtual object comprises, modifying a rendering of the virtual object to include an expression indicating that the virtual object is talking at a reduced volume when the volume of the chat audio signal is below the volume threshold.

Example BH: The computer-implemented method of Examples BF through BG, wherein modifying the expression of the virtual object comprises, modifying a rendering of the virtual object to include an expression indicating that the virtual object is talking at an increased volume when the volume of the chat audio signal is above the volume threshold.

Example BI: The computer-implemented method of Examples BF through BH, further comprising, transitioning the rendering of the virtual object to a second rendering of the virtual object to include a second expression indicating that the virtual object is talking at a reduced volume when the volume of the chat audio signal transitions below a second volume threshold.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A system, comprising:
   a processor;
   a memory in communication with the processor, the memory comprising session data defining a virtual environment, wherein the session data defines coordinates of a plurality of virtual objects, the memory having computer-readable instructions stored thereupon that, when executed by the processor, cause the processor to:
   monitor a volume of a chat audio signal between a first participant and a second participant of a plurality of participants, the chat audio signal generated by an input device associated with the first participant;
   determine that the volume of the chat audio signal between the first participant and the second participant is below a threshold volume;
   determine a distance between a first virtual object controlled by the first participant and a second virtual object controlled by the second participant of the plurality of participants; and
   reduce the volume of the chat audio signal between the first participant and the second participant in response to determining that the volume of the chat audio signal is below the threshold volume and determining that the distance between the first virtual object and the second virtual object exceeds a threshold distance.

2. The system of claim 1, wherein the computer-readable instructions further cause the processor to: communicate the chat audio signal between the first participant and the second participant at a predetermined volume level when the distance is less than the threshold distance.

3. The system of claim 1, wherein the computer-readable instructions further cause the processor to:
   establish a baseline volume based on a voice input from the first participant, wherein the voice input is received prior to a generation of session audio data that is coordinated with activity of the virtual objects; and set the threshold volume at a level that is higher than the baseline volume.

4. The system of claim 3, wherein the baseline volume is established before the first virtual object begins interaction with the virtual environment.

5. The system of claim 1, wherein to reduce the volume results in a decrease of the volume by a predetermined amount.

6. The system of claim 1, wherein reducing the volume comprises terminating the chat audio signal between the first participant and the second participant.

7. A computer-implemented method for controlling a computer-controlled virtual object of a virtual environment, the method comprising:
receiving session data defining the virtual environment, the session data defining a position of the computer-controlled virtual object and a position of a user-controlled virtual object that is based upon an input from a participant controlling the user-controlled virtual object, the session data causing a generation of session audio data that is coordinated with activity of the computer-controlled virtual object;
receiving a chat audio signal that provides vocal communication between the participant and a plurality of participants;
determining that a volume of the chat audio signal generated from a vocal input of the participant at an input device exceeds a volume threshold;
determining, at a computing device, that the position of the computer-controlled virtual object is within a threshold distance of the position of the user-controlled virtual object; and
in response to determining that the volume of the chat audio signal exceeds the volume threshold and determining that the position of the computer-controlled virtual object is within the threshold distance of the position of the user-controlled virtual object, executing a reaction to be performed by the computer-controlled virtual object.

8. The computer-implemented method of claim 7, wherein the reaction comprises, causing the computer-controlled virtual object to express a gesture indicating that the computer-controlled virtual object has detected a presence of the user-controlled virtual object.

9. The computer-implemented method of claim 8, wherein the computing device reduces a probability that the gesture is executed when the volume of the chat audio signal does not exceed the volume threshold.

10. The computer-implemented method of claim 8, wherein the computing device reduces a probability that the gesture is executed when the position of the computer-controlled virtual object is not within the threshold distance of the position of the user-controlled virtual object.

11. The computer-implemented method of claim 7, wherein the reaction comprises, causing the computer-controlled virtual object to perform a gesture that indicates the vocal input of the participant.

12. The computer-implemented method of claim 11, wherein the computing device reduces a probability that the gesture is executed when the volume of the chat audio signal does not exceed the volume threshold.

13. The computer-implemented method of claim 11, wherein the computing device reduces a probability that the gesture is executed when the position of the computer-controlled virtual object is not within the threshold distance of the position of the user-controlled virtual object.

14. The computer-implemented method of claim 7, wherein the reaction comprises modifying a rendering of the user-controlled virtual object to include an expression indicating that the user-controlled virtual object is talking at a reduced volume when the volume of the chat audio signal is below the volume threshold.

15. The computer-implemented method of claim 7, wherein the reaction comprises modifying a rendering of the user-controlled virtual object to include an expression indicating that the virtual object is talking at an increased volume when the volume of the chat audio signal is above the volume threshold.

16. A computer-implemented method, comprising:
monitoring, at a computing device, a volume of a chat audio signal between a first participant and a second participant, wherein the chat audio signal is generated by an input device associated with the first participant, wherein the chat audio signal is communicated to the second participant by a first circuit that is separate from a second circuit for communicating session audio data coordinated with activity of a first virtual object and a second virtual object;
determining that the volume of the chat audio signal is below a threshold volume;
determining that a distance between the first virtual object controlled by the first participant and the second virtual object controlled by the second participant exceeds a threshold distance; and
reducing the volume of the chat audio signal communicated between the first participant and the second participant in response to determining that the chat audio signal is below the threshold volume and determining that the distance between the first virtual object and the second virtual object exceeds a threshold distance.

17. The computer-implemented method of claim 16, further comprising:
delivering the chat audio signal between the first participant and the second participant at a predetermined volume level when the distance is less than the threshold distance.

18. The computer-implemented method of claim 16, further comprising:
determining that a distance between the first virtual object controlled by the first participant and a third virtual object controlled by a third participant is within a threshold distance; and
communicating a chat audio signal communicated between the first participant and the third participant in response to determining that the chat audio signal between the first participant and the third participant and generated by the input device associated with the first participant is below the threshold volume and determining that the distance between the first virtual object and the third virtual object is within the threshold distance.

19. The computer-implemented method of claim 16, further comprising:
establishing a baseline volume based on a voice input from the first participant that is received prior to generation of the session audio data, wherein the baseline volume is established before the first virtual object begins interaction with a virtual environment; and
setting the threshold volume at a level that is higher than the baseline volume.

20. The computer-implemented method of claim 16, further comprising reducing the volume results in zero volume between the first participant and the second participant.

\* \* \* \* \*